US011917697B2

United States Patent
Zhang et al.

(10) Patent No.: US 11,917,697 B2
(45) Date of Patent: Feb. 27, 2024

(54) INTERLACE PRACH DESIGN IN NR-U

(71) Applicant: QUALCOMM Incorporated, San Diego, CA (US)

(72) Inventors: Xiaoxia Zhang, San Diego, CA (US); Jing Sun, San Diego, CA (US); Kapil Bhattad, Bangalore (IN); Zhifei Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 16/522,537

(22) Filed: Jul. 25, 2019

(65) Prior Publication Data

US 2020/0068625 A1    Feb. 27, 2020

(30) Foreign Application Priority Data

Aug. 21, 2018  (IN) .............................. 201841031277

(51) Int. Cl.
*H04W 74/08*     (2009.01)
*H04W 72/0453*   (2023.01)

(52) U.S. Cl.
CPC ... *H04W 74/0866* (2013.01); *H04W 72/0453* (2013.01)

(58) Field of Classification Search
CPC ................ H04W 74/0866; H04W 72/0453
See application file for complete search history.

(56) References Cited

U.S. PATENT DOCUMENTS

| | | | | |
|---|---|---|---|---|
| 2012/0099491 A1* | 4/2012 | Lee | ........................ | H04L 1/0015 370/280 |
| 2013/0343314 A1* | 12/2013 | Tiirola | .................. | H04L 5/0016 370/329 |

(Continued)

FOREIGN PATENT DOCUMENTS

WO    WO-2018045247 A1 *   3/2018

OTHER PUBLICATIONS

Ericsson: "On UL Signals and Channels", 3GPP TSG-RAN WG1 Meeting #94, 3GPP Draft; R1-1809203 on UL Signals and Channels, 3rd Generation Partnership Project (3GPP), Mobile Competence Centre, 650, Route Des Lucioles; F-06921 Sophia-Antipolis Cedex; France, vol. RAN WG1, No. Gothenburg, Sweden; Aug. 20, 2018-Aug. 24, 2018, Aug. 11, 2018 (Aug. 11, 2018), 20 Pages, XP051516573, Retrieved from the Internet: URL: http://www.3gpp.org/ftp/tsg%5Fran/WG1%5FRL1/TSGR1%5F94/Docs/R1%2D1809203%2Ezip [retrieved on Aug. 11, 2018] tables 1, 2, figures 1-11, sections 2-4.

(Continued)

*Primary Examiner* — Derrick W Ferris
*Assistant Examiner* — Sumitra Ganguly
(74) *Attorney, Agent, or Firm* — QUALCOMM Incorporated

(57) ABSTRACT

Physical Random Access Channel (PRACH) interlacing is disclosed. In a particular implementation, a method of performing wireless communications adjusting, by a user equipment (UE) based on a cyclic prefix (CP) length of a received Physical Random Access Channel (PRACH) configuration, CP length of one or more uplink channels to match the CP length of the PRACH configuration. The method additionally includes transmitting, by the UE, the one or more uplink channels interlaced with a PRACH channel that corresponds to the PRACH configuration. The (Continued)

PRACH channel and the one or more uplink channels are aligned.

29 Claims, 13 Drawing Sheets

(56) References Cited

U.S. PATENT DOCUMENTS

| | | | | |
|---|---|---|---|---|
| 2014/0321389 | A1* | 10/2014 | Zhang | H04W 52/28 |
| | | | | 370/329 |
| 2016/0029371 | A1* | 1/2016 | Yang | H04W 72/1268 |
| | | | | 370/329 |
| 2016/0037352 | A1* | 2/2016 | Wei | H04W 72/1268 |
| | | | | 455/454 |
| 2016/0128029 | A1* | 5/2016 | Yang | H04W 48/16 |
| | | | | 370/329 |
| 2017/0347353 | A1* | 11/2017 | Yerramalli | H04L 5/0053 |
| 2018/0097679 | A1* | 4/2018 | Zhang | H04L 27/2607 |
| 2018/0205516 | A1* | 7/2018 | Jung | H04L 5/0007 |
| 2019/0036753 | A1* | 1/2019 | Wu | H04L 5/0039 |
| 2019/0081660 | A1* | 3/2019 | Han | H04L 5/00 |
| 2019/0159261 | A1* | 5/2019 | Jung | H04W 72/542 |
| 2019/0246416 | A1* | 8/2019 | Park | H04W 72/21 |

OTHER PUBLICATIONS

International Search Report and Written Opinion—PCT/US2019/043670—ISA/EPO—dated Oct. 8, 2019.

* cited by examiner

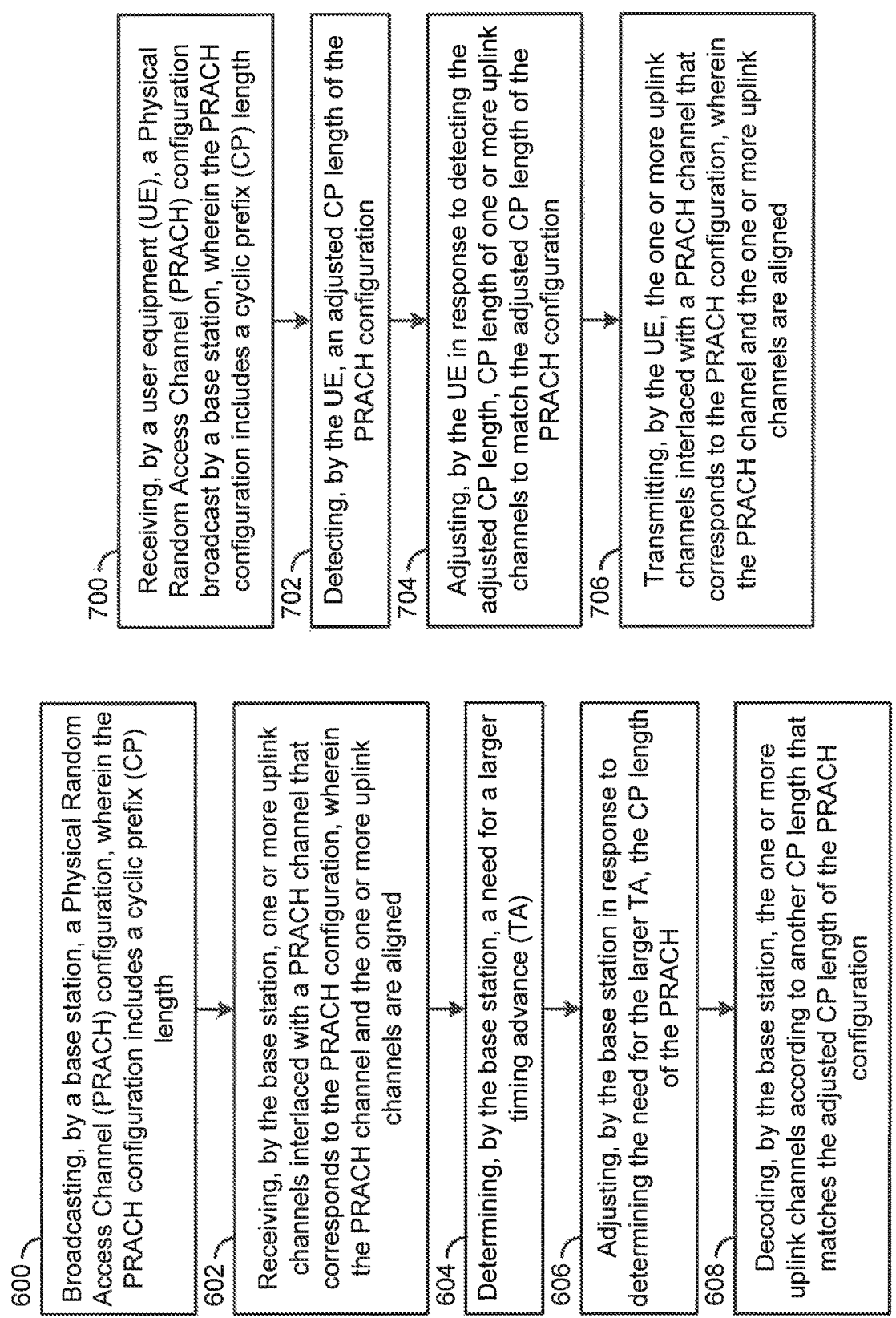

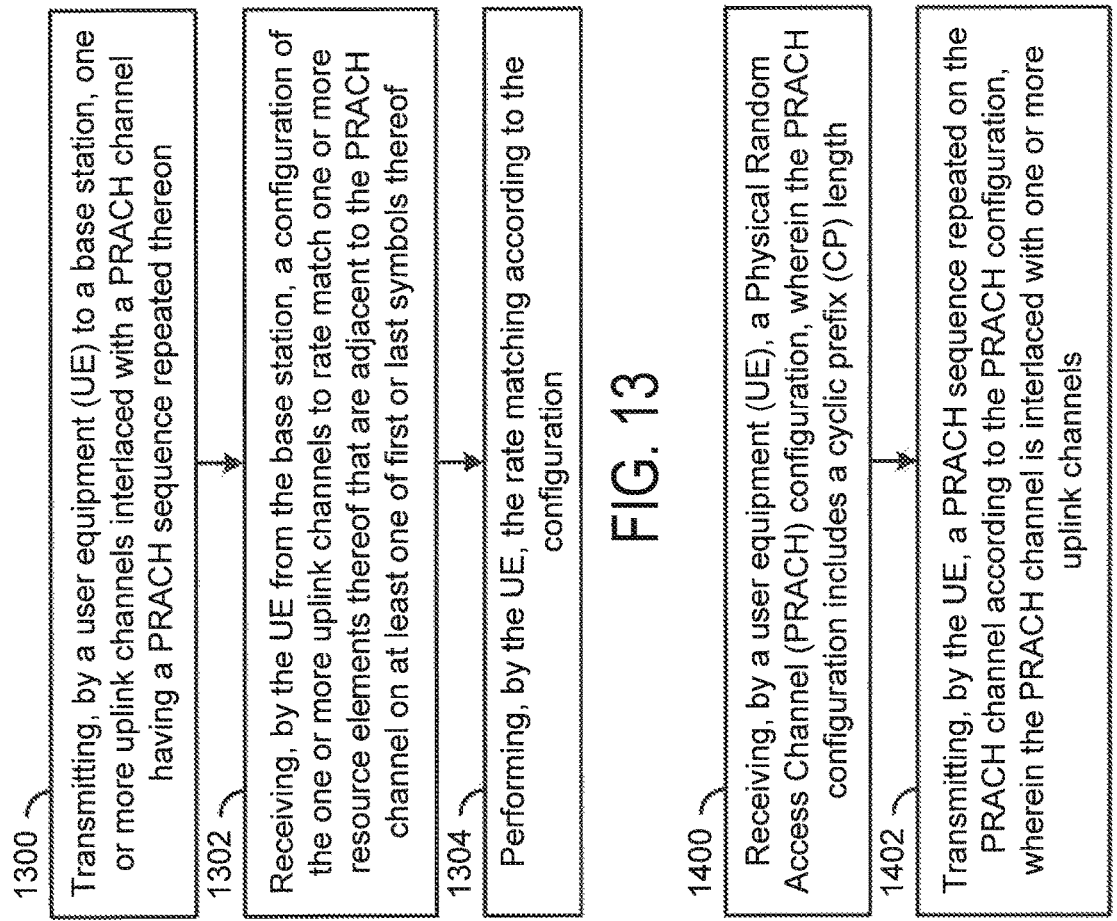
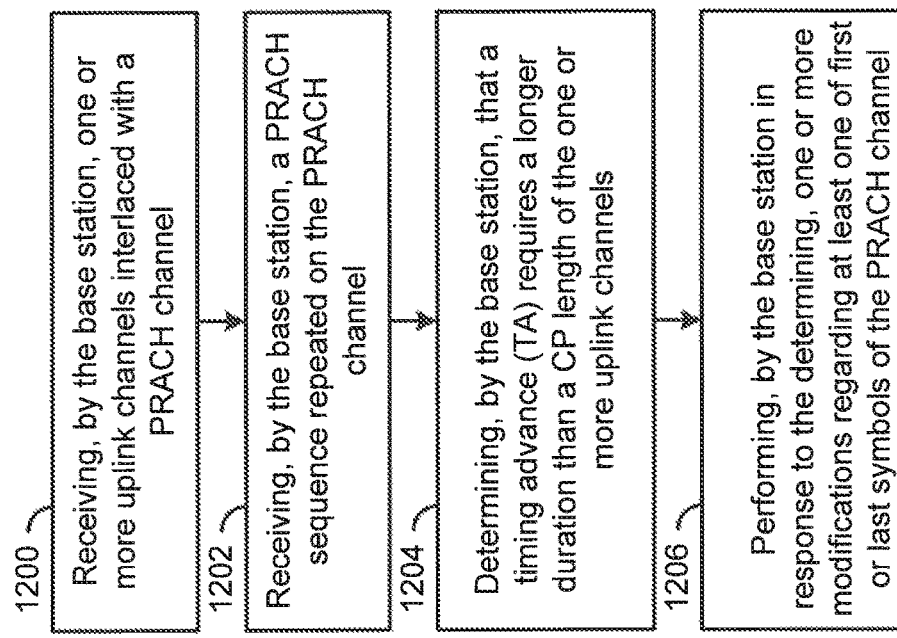

INTERLACE PRACH DESIGN IN NR-U

CROSS-REFERENCE TO RELATED APPLICATIONS

This application claims the benefit of Indian Provisional Patent Application No. 201841031277, entitled, "INTERLACE PRACH DESIGN IN NR-U," filed on Aug. 21, 2018, which is expressly incorporated by reference herein in its entirety.

TECHNICAL FIELD

Aspects of the present disclosure relate generally to wireless communication systems, and more particularly, to interlace Physical Random Access Channel (PRACH) design in New Radio-Unlicensed (NR-U).

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications. For example, one area for improvement may include use of Physical Random Access Channel (PRACH) signals in New Radio-Unlicensed (NR-U). For example, it may be possible to perform interlace based PRACH, however, viable implementations of interlace based PRACH have yet to be identified.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect, a method of performing wireless communications adjusting, by a user equipment (UE) based on a cyclic prefix (CP) length of a received Physical Random Access Channel (PRACH) configuration, CP length of one or more uplink channels to match the CP length of the PRACH configuration. The method additionally includes transmitting, by the UE, the one or more uplink channels interlaced with a PRACH channel that corresponds to the PRACH configuration. The PRACH channel and the one or more uplink channels are aligned.

In another aspect, an apparatus for performing wireless communications includes means for adjusting, by a user equipment (UE) based on a cyclic prefix (CP) length of a received Physical Random Access Channel (PRACH) configuration, CP length of one or more uplink channels to match the CP length of the PRACH configuration. The apparatus also includes means for transmitting, by the UE, the one or more uplink channels interlaced with a PRACH channel that corresponds to the PRACH configuration. The PRACH channel and the one or more uplink channels are aligned.

In another aspect, an apparatus for performing wireless communications includes a computer readable medium having instructions recorded thereon that, when enacted by one or more computer processors, cause the one or more computer processors to adjust, by a user equipment (UE) based on a cyclic prefix (CP) length of a received Physical Random Access Channel (PRACH) configuration, CP length of one or more uplink channels to match the CP length of the PRACH configuration. The instructions additionally cause the one or more computer processors to transmit, by the UE, the one or more uplink channels interlaced with a PRACH channel that corresponds to the PRACH configuration. The PRACH channel and the one or more uplink channels are aligned.

In another aspect, an apparatus for performing wireless communications includes one or more computer processors and a memory coupled to the one or more computer processors. The one or more computer processors is configured to adjust, by a user equipment (UE) based on a cyclic prefix (CP) length of a received Physical Random Access Channel (PRACH) configuration, CP length of one or more uplink channels to match the CP length of the PRACH configuration. The one or more computer processors is additionally configured to transmit, by the UE, the one or more uplink channels interlaced with a PRACH channel that corresponds to the PRACH configuration. The PRACH channel and the one or more uplink channels are aligned.

In another aspect, a method of performing wireless communications includes receiving, by a user equipment (UE), a Physical Random Access Channel (PRACH) configuration that utilizes an interlace structure. The method additionally includes interlacing the PRACH channel with one or more uplink channels. The method further includes performing transmission of one of PRACH or another UL channel using the interlace structure.

In another aspect, an apparatus for performing wireless communications includes means for receiving, by a user equipment (UE), a Physical Random Access Channel (PRACH) configuration that utilizes an interlace structure. The apparatus additionally includes means for interlacing the PRACH channel with one or more uplink channels and means for performing transmission of one of PRACH or another UL channel using the interlace structure.

In another aspect, an apparatus for performing wireless communications includes a computer readable medium having instructions recorded thereon that, when enacted by one or more computer processors, cause the one or more computer processors to receive, by a user equipment (UE), a Physical Random Access Channel (PRACH) configuration that utilizes an interlace structure. The instructions also cause the one or more computer processors to interlace the PRACH channel with one or more uplink channels and perform transmission of one of PRACH or another UL channel using the interlace structure.

In another aspect, an apparatus for performing wireless communications includes one or more computer processors and a memory coupled to the one or more computer processors. The one or more computer processors is configured to receive, by a user equipment (UE), a Physical Random Access Channel (PRACH) configuration that utilizes an interlace structure. The one or more computer processors is additionally configured to interlace the PRACH channel with one or more uplink channels and perform transmission of one of PRACH or another UL channel using the interlace structure.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 is a block diagram illustrating example blocks of a wireless communication procedure carried out by a base station configured according to one or more aspects of the present disclosure.

FIG. 7 is a block diagram illustrating example blocks of a wireless communication procedure carried out by a user equipment (UE) configured according to one or more aspects of the present disclosure.

FIG. 12 is a block diagram illustrating example blocks of a wireless communication procedure carried out by a base station configured according to one or more aspects of the present disclosure.

FIG. 13 is a block diagram illustrating example blocks of a wireless communication procedure carried out by a UE configured according to one or more aspects of the present disclosure.

FIG. 14 is a block diagram illustrating example blocks of a wireless communication procedure carried out by a UE configured according to one or more aspects of the present disclosure.

DETAILED DESCRIPTION

Figure 1:
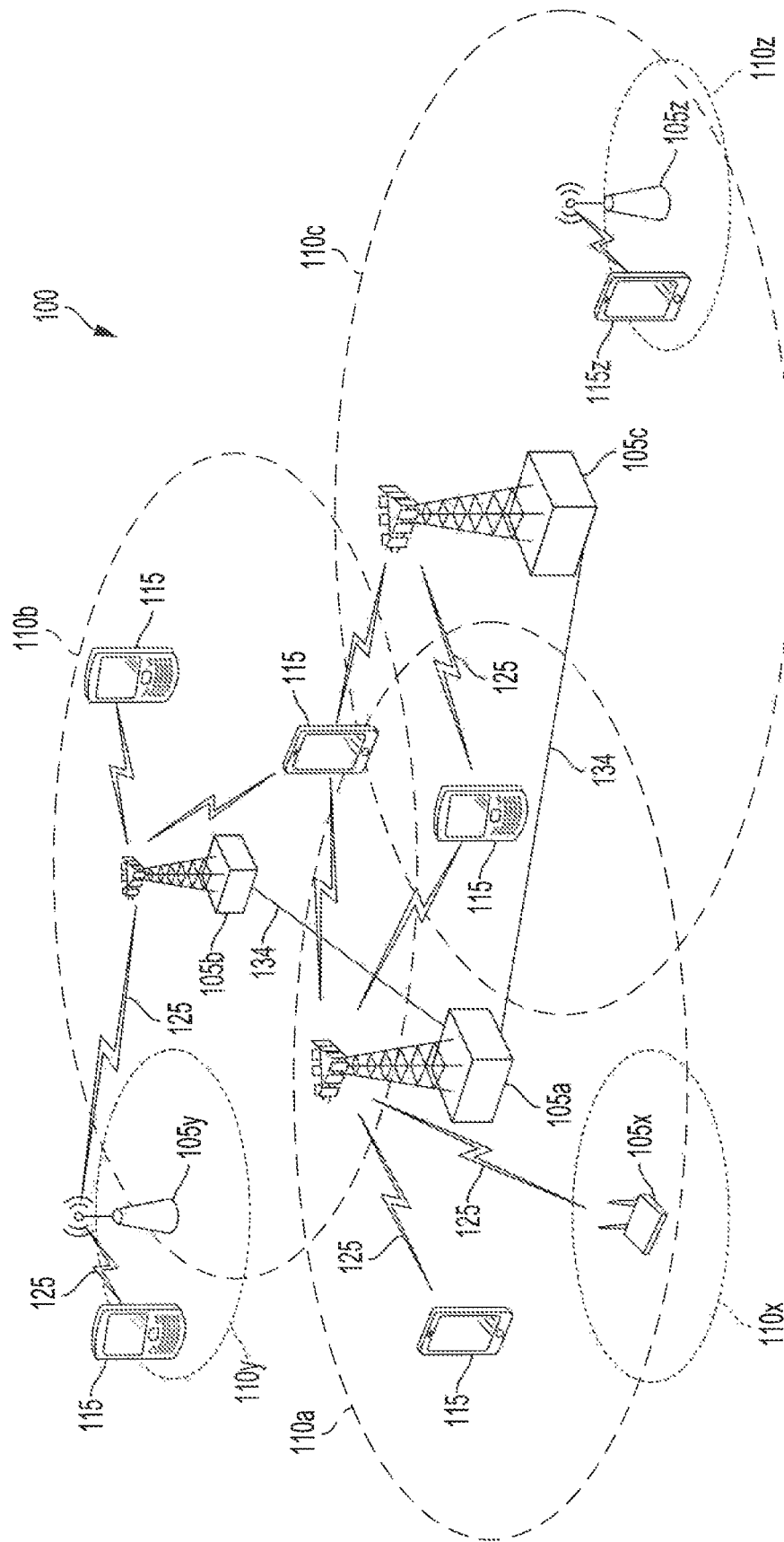
FIG. 1 is a block diagram illustrating details of a wireless communication system according to one or more aspects of the present disclosure.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, long term evolution (LTE) networks, Global System for Mobile Communications (GSM) networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Turning back to FIG. 1 wireless network 100 includes a number of base stations, such as may comprise evolved node Bs (eNBs) or G node Bs (gNBs). These may be referred to as gNBs 105. A gNB may be a station that communicates with the UEs and may also be referred to as a base station, a node B, an access point, and the like. Each gNB 105 may provide communication coverage for a particular geographic area. In 3GPP, the term "cell" can refer to this particular geographic coverage area of a gNB and/or a gNB subsystem serving the coverage area, depending on the context in which the term is used. In implementations of wireless network 100 herein, gNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

A gNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. In the example shown in FIG. 1, gNBs 105a, 105b and 105c are macro gNBs for the macro cells 110a, 110b and 110c, respectively. gNBs 105x, 105y, and 105z are small cell gNBs, which may include pico or femto gNBs that provide service to small cells 110x, 110y, and 110z, respectively. A gNB may support one or multiple (e.g., two, three, four, and the like) cells.

Wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. In some scenarios, networks may be enabled or configured to handle dynamic switching between synchronous or asynchronous operations.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro gNBs, pico gNBs, femto gNBs, relays, and the like. In FIG. 1, a lightning bolt (e.g., communication links 125) indicates wireless transmissions between a UE and a serving gNB, which is a gNB designated to serve the UE on the downlink and/or uplink, or desired transmission between gNBs. Although backhaul communication 134 is illustrated as wired backhaul communications that may occur between gNBs, it should be appreciated that backhaul communications may additionally or alternatively be provided by wireless communications.

Figure 2:
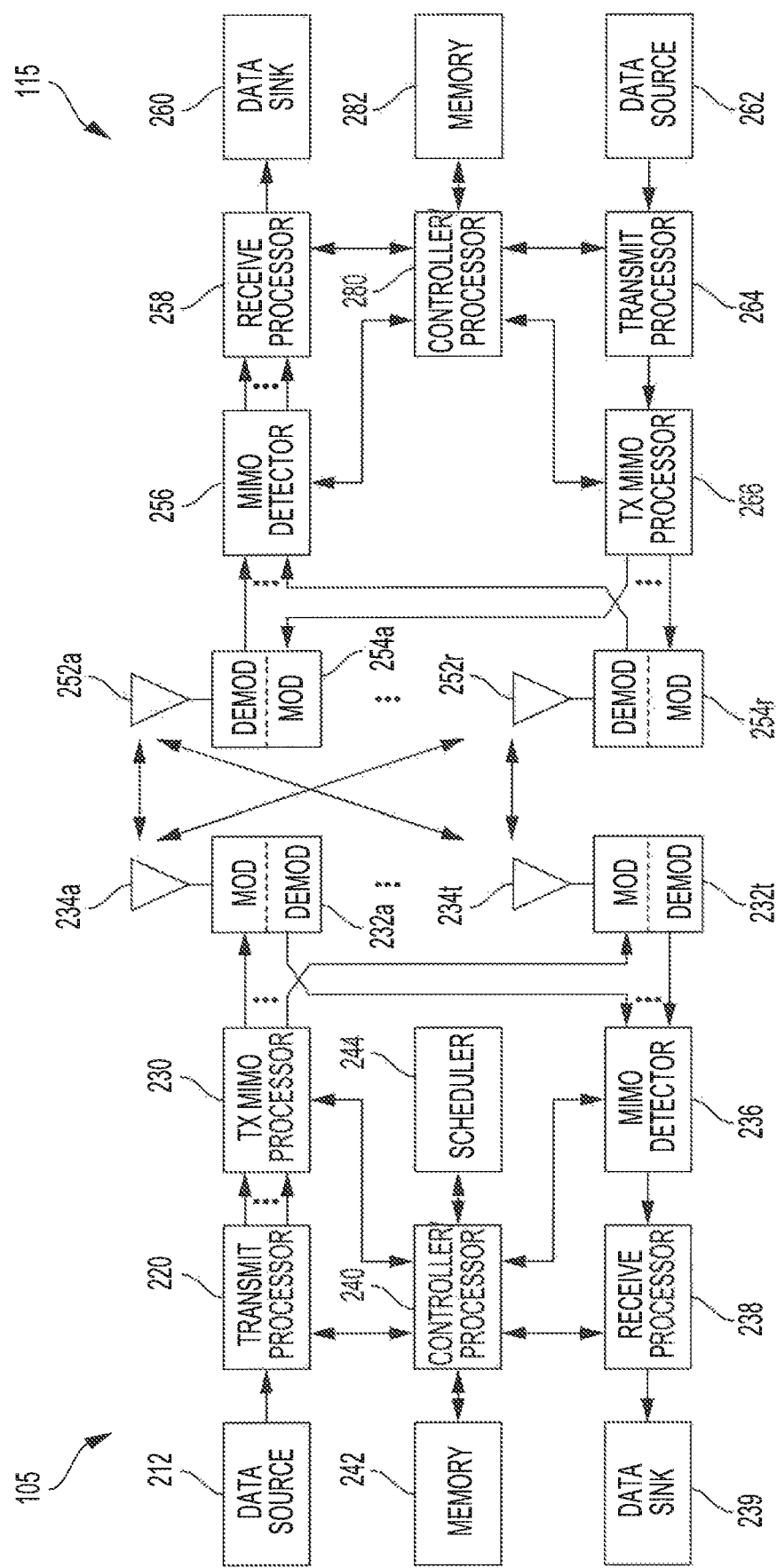
FIG. 2 is a block diagram conceptually illustrating a design of a base station and a UE configured according to one or more aspects of the present disclosure.

FIG. 2 shows a block diagram of a design of base station/gNB 105 and UE 115. These can be one of the base stations/gNBs and one of the UEs in FIG. 1. For a restricted association scenario (as mentioned above), the gNB 105 may be small cell gNB 105z in FIG. 1, and UE 115 may be UE 115z, which in order to access small cell gNB 105z, would be included in a list of accessible UEs for small cell gNB 105z. gNB 105 may also be a base station of some other type. gNB 105 may be equipped with antennas 234a through 234t, and UE 115 may be equipped with antennas 252a through 252r.

At gNB 105, transmit processor 220 may receive data from data source 212 and control information from controller/processor 240. The control information may be for the physical broadcast channel (PBCH), physical control format indicator channel (PCFICH), physical hybrid-ARQ indicator channel) PHICH, physical downlink control channel (PDCCH), etc. The data may be for the physical downlink shared channel (PDSCH), etc. Transmit processor 220 may process (e.g., encode and symbol map) the data and control information to obtain data symbols and control symbols, respectively. Transmit processor 220 may also generate reference symbols, e.g., for the primary synchronization signal (PSS), secondary synchronization signal (SSS), and cell-specific reference signal (CRS). Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from gNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to gNB 105. At gNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at gNB 105 and UE 115, respectively. Controller/processor 240 and/or other processors and modules at gNB 105 and/or controllers/processor 280 and/or other processors and modules at UE 115 may perform or direct the execution of various processes for the techniques described herein, such as to perform or direct the execution illustrated in FIGS. 3-16, and/or other processes for the techniques described herein. Memories 242 and 282 may store data and program codes for gNB 105 and UE 115, respectively. Scheduler 244 may schedule UEs for data transmission on the downlink and/or uplink.

Figure 3:
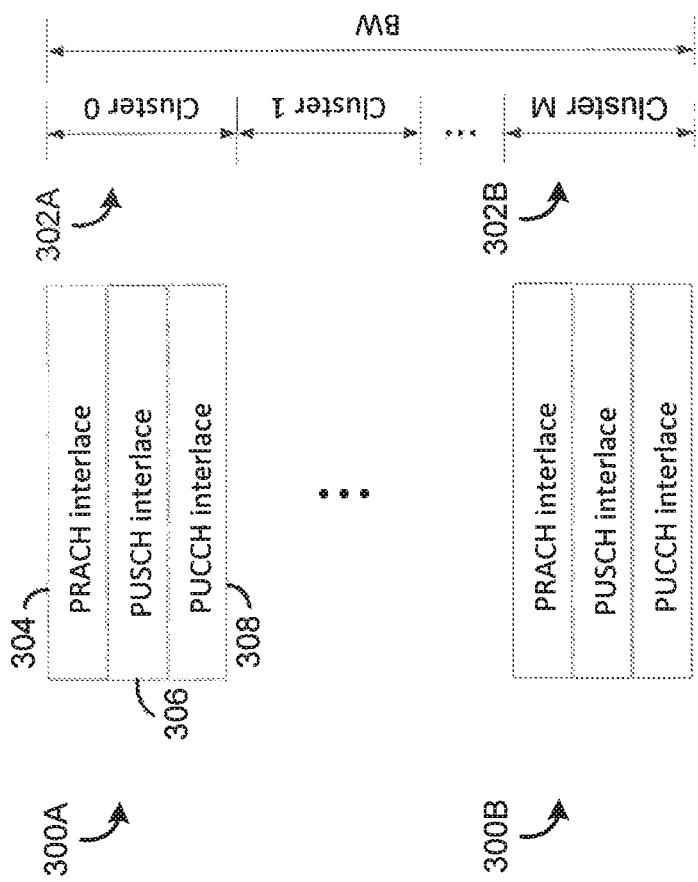
FIG. 3 is a block diagram illustrating PRACH and PUSCH/PUCCH interlaced structure multiplexed on a same UL slot on different interlaces configured according to one or more aspects of the present disclosure.

Referring to FIG. 3, an example of PRACH and PUSCH/PUCCH interlaced structure may be multiplexed on a same uplink (UL) slot on different interlaces is shown. A bandwidth BW is partitioned into clusters (302A, 302B), wherein each cluster corresponds to one resource block (e.g., 300A, 300B) which spans a set of contiguous tones in frequency (such a 12 tones) and a contiguous set of OFDM symbols in time (such as all symbols over an UL slot). Uplink channels, such as PRACH (e.g., 304), PUSCH (e.g., 306), and PUCCH (e.g., 308) channels from one or more users (e.g., one or more UEs), may be multiplexed on the same UL slot using a block interlace structure, where each block interlace includes spaced resource blocks, such as uniformly spaced resource blocks, as an illustrative, non-limiting example. To illustrate, for a system containing 100 resource blocks, 10 interlaces may be defined, with interlace 0 containing RBs (0, 10, 20 . . . 90), interlace 1 containing RBs {1, 11, 21, . . . 91}, etc. Each channel, which may be sent by the same or one or more different UEs, is given one or more interlaces for its transmission. For example, PRACH is given (e.g., assigned) interlace 0, PUCCH of UE1 is given interlace 1, PUSCH of UE2 is given interlace (2, 3, 4), etc. This wireless transmission scheme is an example of block interlace according to the present disclosure. In unlicensed operations, a minimum limit on occupied channel bandwidth (OCB) may be set, such as requiring each UE to span at least 80% of the system bandwidth for its typical transmissions. Additionally, or alternatively, a PSD constraints may be set, such as UE transmit power cannot exceed 13 dBm per MHz. To illustrate, the minimum limit on OCB and/or the PSD constraint may be set (e.g., imposed) or established according to one or more regulations and/or one or more standards. The interlace structure described here is able to meet such OCB requirement(s) and has only one RB per MHz which allows larger power to be transmitted in each RB, thereby allowing much more efficient use of the medium. Examples further illustrated below with reference to FIGS. 4-16 depict and/or describe PRACH interlaced with PUSCH for simplicity of illustration, and it should be understood that additional UL channels, such as PUCCH, may also be interlaced on the UL slots.

Figure 4:
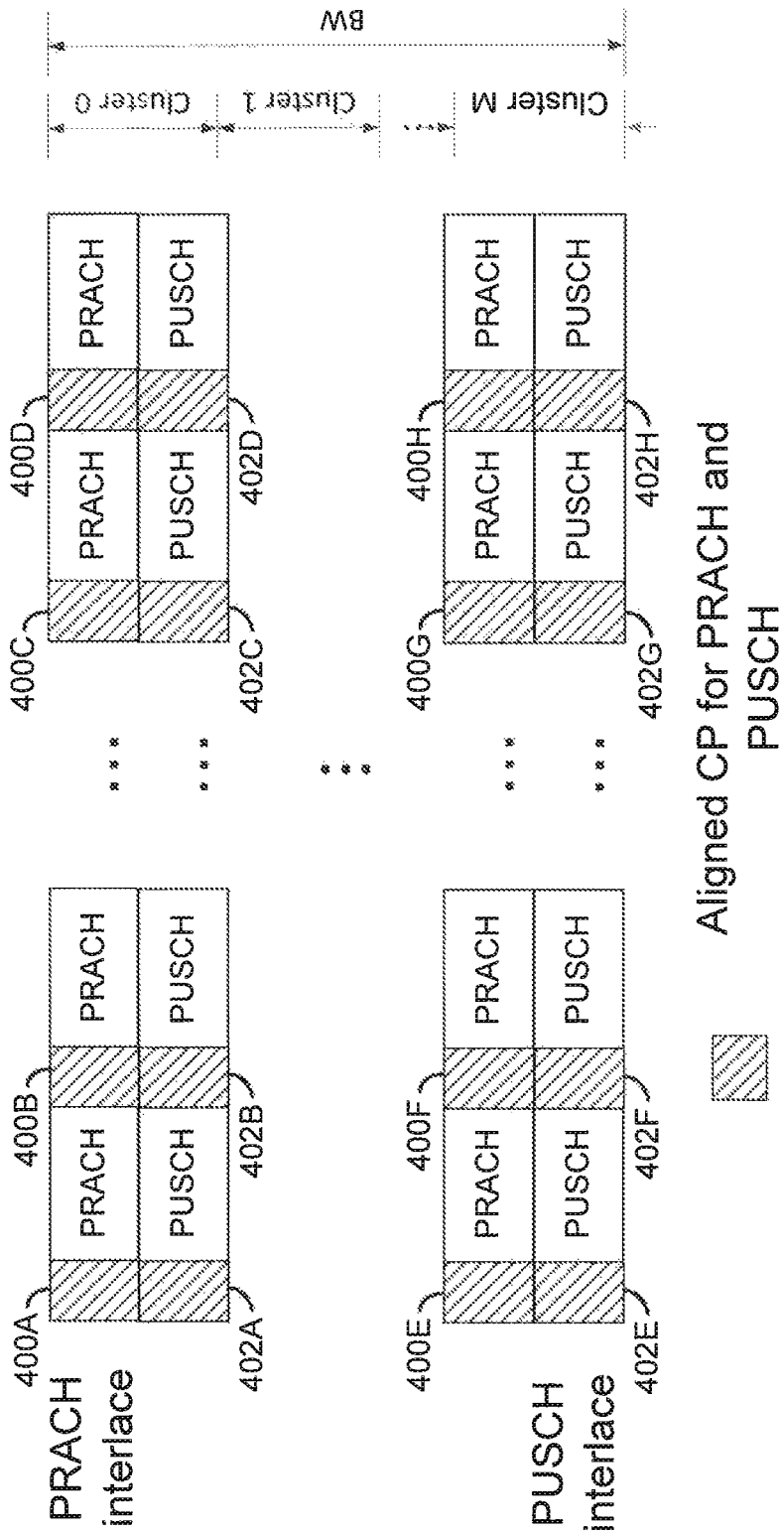
FIG. 4 is a block diagram illustrating aligned SubCarrier Spacing (SCS), Cyclic Prefix (CP), and symbol boundary between PRACH and other uplink channels configured according to one or more aspects of the present disclosure.

Turning now to FIG. 4, an example of a methodology for implementing block interlace utilizes aligned SubCarrier Spacing (SCS), Cyclic Prefix (CP), and symbol boundary between PRACH and other uplink channels, such as PUSCH, is shown. As shown, the CP 400A-400H for PRACH is aligned with the CP 402A-402H for PUSCH. This alignment avoids adjacent tone interference between PRACH and other channels to minimize the system overhead. However, this option may rely on small timing advance (TA) in the deployment scenario where the TA and delay spread of the channel is preferably covered by the CP duration.

In NR-U, 60 kilohertz (kHz) SCS may be implemented/used. With 60 kHz numerology, the normal CP (NCP) may cover up to ~1.2 microseconds (μs). This time period implies that the supported timing advance (TA) is rather limited with interlace PRACH structure with 60 kHz SCS. NR-U will also support 30 kHz SCS. Even with 30 kHz SCS, the NCP duration scales up twice, however, the TA is still rather limited. Extended CP (ECP) may be introduced with the PRACH channel when larger TA is required. To maintain the alignment, the other UL channels also need to support ECP when they need to multiplex with PRACH in the frequency domain in the same slot/mini-slot. Accordingly, when large TA is expected, longer CP may be used for both PRACH and other channels. In this structure, the sequence transmitted on the multiple PRACH symbols can be different. It is also possible to apply spreading on top of the multiple PRACH symbols to increase the multiplexing capability.

Figure 5:
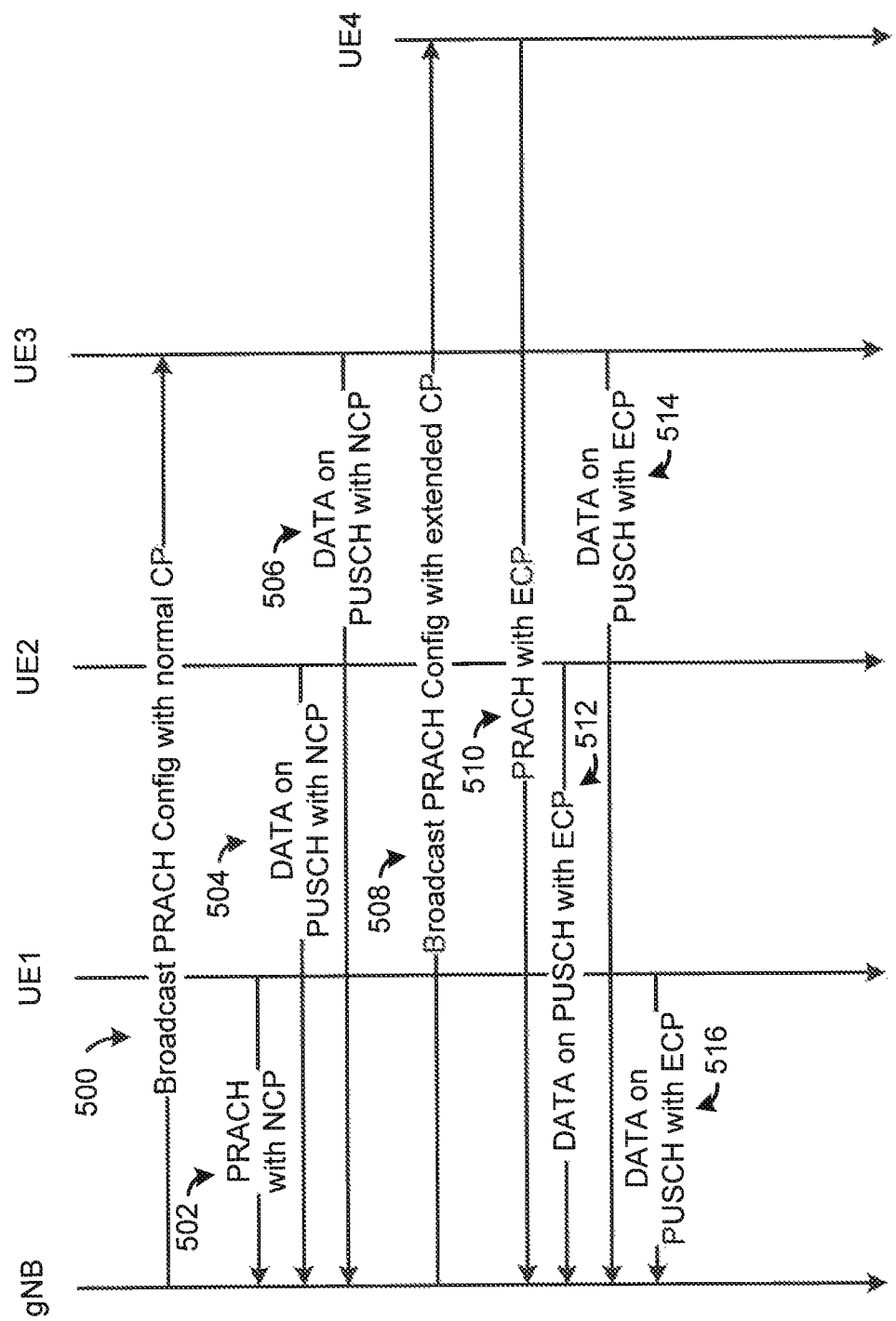
FIG. 5 is a transmission timing diagram illustrating an example of wireless communication according to one or more aspects of the present disclosure.

FIG. 5 provides an example of wireless communication using the aligned block interlace described above. At 500, a base station gNB broadcasts a PRACH configuration having NCP, and user equipments UE1, UE2, and UE3 in range of the base station receive this broadcast configuration. At 502, UE1 transmits a PRACH with NCP to the base station. Contemporaneously, at 504 and 506, UE2 and UE3 transmit data on PUSCH with NCP. UE2 and UE3 utilize NCP on PUSCH at 504 and 506 because of the observed NCP in the PRACH configuration broadcast at 500. The base station also knows to expect NCP on PUSCH because it broadcast NCP in the PRACH configuration at 500.

In another deployment scenario, the base station decides that an ECP is needed for PRACH considering the potential TA (timing advance) associated with the supported cell radius, and, at 508, the base station broadcasts a PRACH configuration with ECP. For example, for a cell with large cell radius, signals from UEs at the edge reach with a large delay at the base station (e.g., a gNB). In the same large cell, signals from UEs close to base station reach almost immediately with seemingly no delay. A cell with a large radius has to support UEs with a large range of delay. Accordingly, the base station may use a larger CP (e.g., ECP). This broadcast transmission is received by UE1, UE2, UE3, and UE4. At 510, UE4 transmits a PRACH with ECP to the base station. Contemporaneously, at 512, 514, and 516, UE1, UE2, and UE3 transmit data on PUSCH with ECP when the UL transmission is on the same time and multiplexed with the PRACH transmission in frequency domain on different interlace. UE1, UE2, and UE3 utilize ECP on PUSCH at 512, 514, and 516 because of the observed ECP in the PRACH configuration broadcast at 508. The base station also knows to expect ECP on PUSCH because it broadcast ECP in the PRACH configuration at 508. It is noted that the UL transmissions can still use their own CP (e.g., NCP) and may not aligned with PRACH CP duration when they are multiplexed with PRACH transmission in time domain. In other words, the UL transmissions follow PRACH CP when they are multiplexed with the configured PRACH resources in frequency domain; while the UL transmissions can follow their own CP when they are not multiplexed with the configured PRACH resources in frequency domain. The UL transmissions can include PUSCH, PUCCH (physical UL control channel), SRS (sounding reference signal), SR (scheduling request), PTRS (phase tracking reference signal), etc.

As described with reference to one or more of FIGS. 2-5, an adaptation of uplink channels is enabled and/or provided to accommodate an increase in size of a cyclic prefix of a PRACH channel interlaced with the uplink channels. The adaptation (e.g., an interlace structure) is able to meet such OCB requirement(s) and may have only one RB per MHz which allows larger power to be transmitted in each RB, thereby allowing efficient use of the medium.

FIG. 6 is a block diagram illustrating example blocks of a wireless communication procedure carried out by a base station. At block 600, the procedure begins with broadcasting, by a base station, a Physical Random Access Channel (PRACH) configuration, wherein the PRACH configuration includes a cyclic prefix (CP) length. Processing may proceed from block 600 to block 602.

At block 602, the procedure continues with receiving, by the base station, one or more uplink channels interlaced with a PRACH channel that corresponds to the PRACH configuration. The one or more uplink channels interlaced with the PRACH channel may include a Physical Uplink Shared Channel (PUSCH) and/or a Physical Uplink Control Channel (PUCCH). The PRACH channel and the one or more uplink channels are aligned. For example, the PRACH channel and the one or more uplink channels may be aligned in terms of subcarrier spacing (SCS), CP, and symbol boundary. Processing may proceed from block 602 to block 604.

At block 604, the procedure continues with determining, by the base station, a need for a larger timing advance (TA). This determination may be based on the deployment scenario. For example, the base station may make a determination of a size of TA based on cell radius. To illustrate, for a cell with large cell radius, signals from UEs at the edge reach with a large delay at the base station (e.g., a gNB). In the same large cell, signals from UEs close to base station reach almost immediately with seemingly no delay. A cell with a large radius has to support UEs with a large range of delay. Accordingly, the base station may determine to use a larger CP (e.g., ECP). Alternatively, a relatively small cell (e.g., small radius) may need to only support UEs with a smaller range of delay and hence normal CP may be determined to be sufficient. Processing may proceed from block 604 to block 606.

At block 606, the procedure continues with adjusting, by the base station in response to determining the need for the larger TA, the CP length of the PRACH configuration. For example, the broadcast at block 600 may be changed to indicate ECP instead of NCP. Accordingly, different channels may have different CPs (e.g., CP requirements) in different deployment scenarios—e.g., based on cell size. To illustrate, different CP lengths may be used for PRACH and other uplink channels because, for PRACH, a UE may not need to be in tight timing synchronization with a network—e.g., the UE may only have a rough estimate of timing based on timing measurement that the UE performs in downlink communications. For other channels, the base station (e.g., a gNB) may send timing advance/retard commands to enable the UE get in sync. The base station (e.g., a gNB) may send the TA commands based on past UL transmissions, such as from PRACH, such that timing is appropriately aligned. Accordingly, for PRACH in a large cell (a relatively large radius cell), ECP may be used for PRACH, but other channels may use NCP. For a small cell (a relatively small radius cell), NCP may be used for both PRACH and other UL channels. Processing may proceed from block 606 to block 608.

At block 608, the procedure continues with decoding, by the base station, the one or more uplink channels according to another CP length that matches the adjusted CP length of the PRACH configuration when the uplink channels are multiplexed with the configured PRACH resources in frequency domain and using the regular CP length when uplink channels are not multiplexed with PRACH resources in the frequency domain. After block 608, the procedure may return to an earlier point in the process, such as block 600. Alternatively, the procedure may end.

In some implementations, the one or more uplink channels use a different CP length when they are not multiplexed with configured PRACH resources in frequency domain. Additionally, or alternatively, the one or more uplink channels can be multiplexed with configured PRACH resources in different interlace.

FIG. 7 is a block diagram illustrating example blocks of a wireless communication procedure carried out by a UE. At block 700, the procedure begins with receiving, by a UE, a Physical Random Access Channel (PRACH) configuration broadcast by a base station. The PRACH configuration includes a cyclic prefix (CP) length. In some implementations, processing may proceed from block 700 to block 702.

At block 702, the procedure continues with detecting, by the UE, an adjusted CP length of the PRACH configuration. For example, the CP length may change from NCP to ECP. Processing may proceed from block 702 to block 704.

At block 704, the procedure continues with adjusting, by the UE in response to detecting the adjusted CP length, another CP length of the one or more uplink channels to match the adjusted CP length of the PRACH configuration. For example, the UE may adjust the other CP length of the one or more uplink channels to match the adjusted CP length of the PRACH configuration if they are multiplexed in frequency domain with the configured PRACH resources and may use the regular cyclic prefix otherwise. Processing may proceed from block 704 to block 706.

At block 706, the procedure continues with transmitting, by the UE, one or more uplink channels interlaced with a PRACH channel that corresponds to the PRACH configuration. The one or more uplink channels interlaced with the PRACH channel may include a Physical Uplink Shared Channel (PUSCH) and/or a Physical Uplink Control Channel (PUCCH). The PRACH channel and the one or more uplink channels are aligned. For example, the one or more uplink channels may be aligned in terms of subcarrier spacing (SCS), CP, and symbol boundary. After block 706, processing may return to an earlier point in the process, such as block 700. Alternatively, processing may end.

In some implementations, one or more blocks for performing wireless communications include performing wireless communications adjusting, by a user equipment (UE) based on a cyclic prefix (CP) length of a received Physical Random Access Channel (PRACH) configuration, CP length of one or more uplink channels to match the CP length of the PRACH configuration. The one or more blocks may additionally include transmitting, by the UE, the one or more uplink channels interlaced with a PRACH channel that corresponds to the PRACH configuration. The PRACH channel and the one or more uplink channels are aligned. The one or more uplink channels interlaced with the PRACH channel may include at least one of a Physical Uplink Shared Channel (PUSCH), sounding reference signal (SRS), a scheduling request (SR), or a Physical Uplink Control Channel (PUCCH). For example, the one or more uplink channels may be interlaced with the PRACH channel includes the PUSCH. As another example, the one or more uplink channels may be interlaced with the PRACH channel includes the PUCCH.

In some implementations, the adjusted CP is used when the one or more uplink channels are frequency domain multiplexed with the PRACH channel. For example, a block interlace structure may be used to multiplex the one or more uplink channels in frequency domain. Additionally, or alternatively, the one or more blocks may include transmitting, by the UE, the one or more uplink channels using the unadjusted CP when the uplink channel is not frequency domain multiplexed with the PRACH channel.

In some implementations, the one or more blocks may include receiving, by the UE, the PRACH configuration. For example, the PRACH configuration is received from a base station. Additionally, or alternatively, the one or more blocks may include detecting, by the UE, the CP length of the PRACH configuration.

In some implementations, the CP length of the one or more uplink channels is adjusted to match the CP length of the PRACH configuration in response to detection of the CP length of the PRACH. For example, adjusting the CP length of one or more uplink channels comprises adjusting CP length of multiple uplink channels to match the CP length of the PRACH configuration.

In some implementations, the PRACH channel and the one or more uplink channels are aligned in terms of subcarrier spacing (SCS), CP, symbol boundary, or a combination thereof. wherein the PRACH sequence is different across different symbols. Additionally, or alternatively, the one or more blocks may include performing spreading in time using an orthogonal cover code corresponding to multiple PRACH symbols. Spreading may be performed to increase a multiplexing capability.

Figure 8:
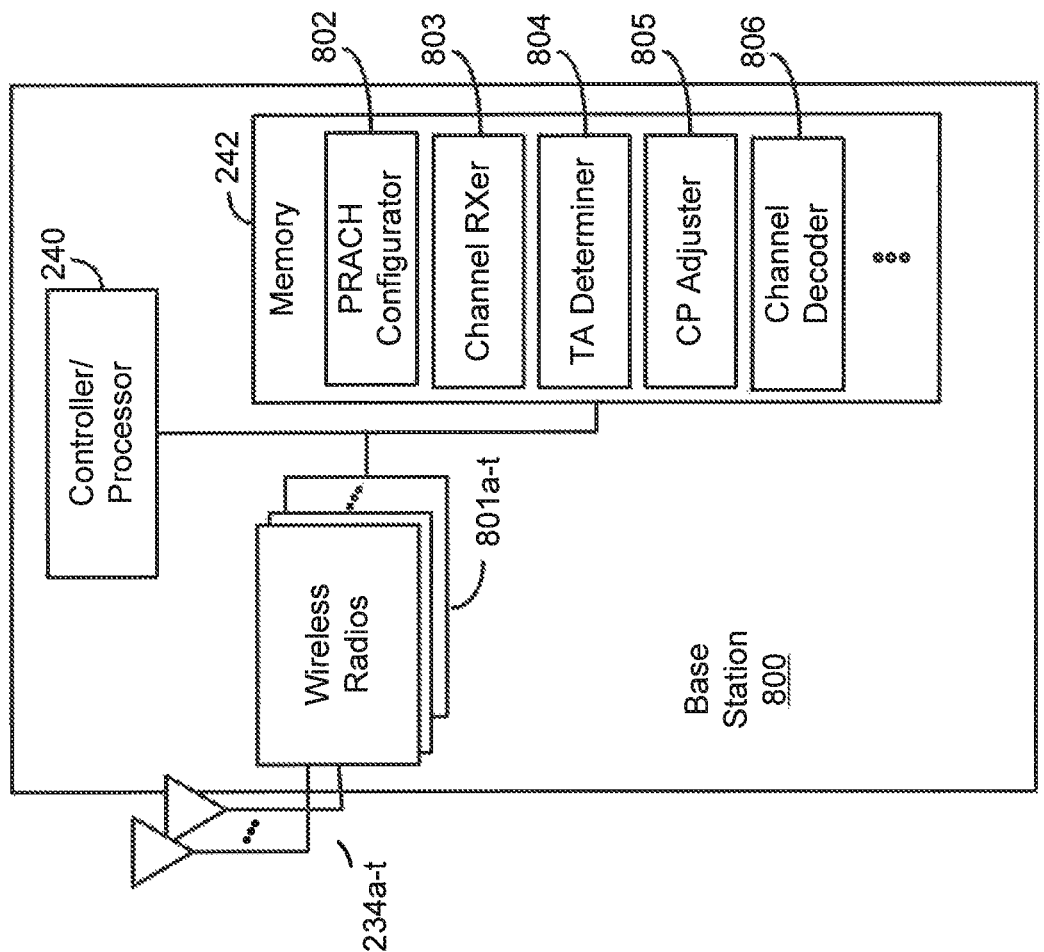
FIG. 8 is a block diagram illustrating a base station configured according to one or more aspects of the present disclosure.

Turning now to FIG. 8, a base station 800, such as a NR-SS base station 105 (see FIG. 2), may have a controller/processor 240, a memory 242, and antennas 234a through 234t, as described above. The base station 800 may also have wireless radios 801a to 801t that comprise additional components also described above with reference to FIG. 2. The memory 242 of base station 800 stores algorithms that configure processor/controller 240 to carry out procedures as described above with reference to FIGS. 3-7.

Algorithms stored by memory 242 configure processor/controller 240 to carry out operations relating to wireless communication by the base station 800, as previously described. For example, PRACH configurator 802 configures controller processor 240 to carry out operations that include broadcasting a PRACH configuration in any manner previously described. Additionally, channel receiver 803 configures controller processor 240 to carry out operations that include receiving one or more UL channels interlaced with a PRACH channel in any manner previously described. Also, TA determiner 804 configures controller processor 240 to carry out operations that include determining a need for a larger TA in any manner previously described. Further, CP adjuster 805 configures controller processor 240 to carry out operations that include adjusting CP length of the PRACH configuration in any manner previously described. Further, channel decoder 806 configures controller processor 240 to carry out operations that include decoding the UL channels in any manner previously described.

In some implementations, an apparatus for performing wireless communications includes means for broadcasting, by a base station (e.g., 800), a Physical Random Access Channel (PRACH) configuration. The PRACH configuration includes a cyclic prefix (CP) length. The apparatus additionally includes means for receiving, by the base station, one or more uplink channels interlaced with a PRACH channel that corresponds to the PRACH configuration. The PRACH channel and the one or more uplink channels are aligned. The apparatus also includes means for determining, by the base station, a need for a larger timing advance (TA), and means for adjusting, by the base station in response to the means for determining the need for the larger TA, the CP length of the PRACH configuration. The apparatus further includes means for decoding, by the base station, the one or more uplink channels according to another CP length that matches the adjusted CP length of the PRACH configuration.

In an aspect, an apparatus for performing wireless communications includes a computer readable medium (e.g., memory 242) having instructions recorded thereon that, when enacted by one or more computer processors (e.g., processor/controller 240), cause the one or more computer processors to broadcast, by a base station (e.g., 800), a Physical Random Access Channel (PRACH) configuration. The PRACH configuration includes a cyclic prefix (CP) length. The instructions additionally cause the one or more computer processors to receive, by the base station, one or more uplink channels interlaced with a PRACH channel that corresponds to the PRACH configuration. The PRACH channel and the one or more uplink channels are aligned. The instructions also cause the one or more computer processors to determine, by the base station, a need for a larger timing advance (TA), and to adjust, by the base station in response to determining the need for the larger TA, the CP length of the PRACH configuration. The instructions further cause the one or more computer processors to decode, by the base station, the one or more uplink channels according to another CP length that matches the adjusted CP length of the PRACH configuration.

In another aspect, an apparatus configured for wireless communications includes one or more computer processors (e.g., processor/controller 240) and a memory (e.g., memory 242) coupled to the one or more computer processors. The one or more computer processors is configured to broadcast, by a base station (e.g., 800), a Physical Random Access Channel (PRACH) configuration. The PRACH configuration includes a cyclic prefix (CP) length. The one or more computer processors is additionally configured to receive, by the base station, one or more uplink channels interlaced with a PRACH channel that corresponds to the PRACH configuration. The PRACH channel and the one or more uplink channels are aligned. The one or more computer processors is also configured to determine, by the base station, a need for a larger timing advance (TA), and adjust, by the base station in response to determining the need for the larger TA, the CP length of the PRACH configuration. The one or more computer processors is configured to decode, by the base station, the one or more uplink channels according to another CP length that matches the adjusted CP length of the PRACH configuration.

Figure 9:
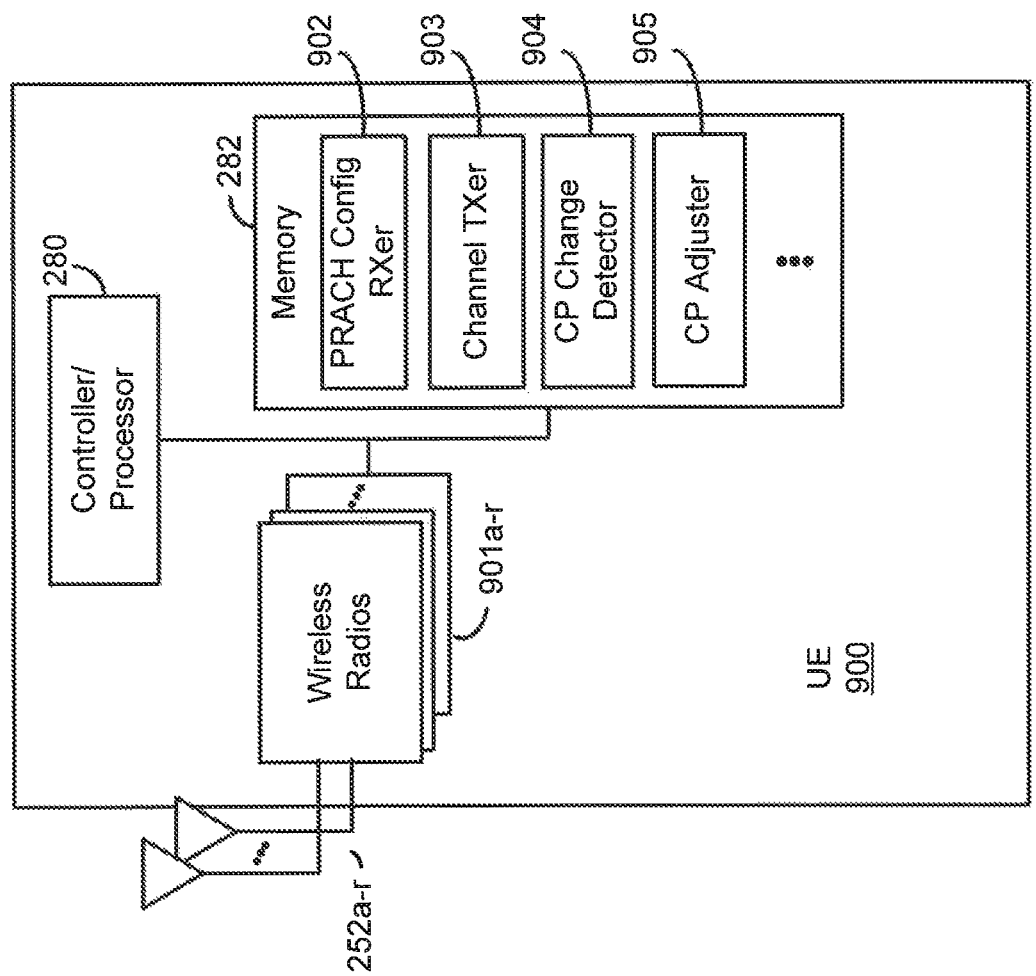
FIG. 9 is a block diagram illustrating a UE configured according to one or more aspects of the present disclosure.

Turning now to FIG. 9, a UE 900, such as a UE 115 (see FIG. 2), may have a controller/processor 280, a memory 282, and antennas 252a through 252r, as described above. UE 900 may also have wireless radios 901a to 901r that comprise additional components also described above with reference to FIG. 2. The memory 282 of UE 900 stores algorithms that configure processor/controller 280 to carry out procedures as described above with reference to FIGS. 3-7.

Algorithms stored by memory 282 configure processor/controller 280 to carry out procedures relating to wireless communication by the UE 900, as previously described. For example, PRACH configuration receiver 902 configures controller processor 280 to carry out operations that include receiving a PRACH configuration in any manner previously described. Additionally, channel transmitter 903 configures controller processor 280 to carry out operations that include transmitting one or more UL channels interlaced with a PRACH channel in any manner previously described. Also, CP change detector 904 configures controller processor 280 to carry out operations that include detecting an adjusted CP length in the received PRACH configuration in any manner previously described. Further, CP adjuster 905 configures controller processor 280 to carry out operations that include adjusting CP length of the one or more UL channels in any manner previously described.

In another aspect, an apparatus for performing wireless communications includes means for receiving, by a user equipment (UE) (e.g., 900), a Physical Random Access Channel (PRACH) configuration broadcast by a base station (e.g., 800). The PRACH configuration includes a cyclic prefix (CP) length. The apparatus additionally includes means for detecting, by the UE, an adjusted CP length of the PRACH configuration. The apparatus also includes means for adjusting, by the UE in response to the means for detecting the adjusted CP length, CP length of one or more uplink channels to match the adjusted CP length of the PRACH configuration. The apparatus further includes means for transmitting, by the UE, the one or more uplink channels interlaced with a PRACH channel that corresponds to the PRACH configuration. The PRACH channel and the one or more uplink channels are aligned.

In another aspect, an apparatus for performing wireless communications includes a computer readable medium (e.g., memory 282) having instructions recorded thereon that, when enacted by one or more computer processors (e.g., controller/processor 280), cause the one or more computer processors to receive, by a user equipment (UE) (e.g., 900), a Physical Random Access Channel (PRACH) configuration broadcast by a base station. The PRACH configuration includes a cyclic prefix (CP) length. The instructions additionally cause the one or more computer processors to detect, by the UE, an adjusted CP length of the PRACH configuration. The instructions also cause the one or more computer processors to adjust, by the UE in response to detecting the adjusted CP length, CP length of one or more uplink channels to match the adjusted CP length of the PRACH configuration. The instructions further cause the one or more computer processors to transmit, by the UE, the one or more uplink channels interlaced with a PRACH channel that corresponds to the PRACH configuration. The PRACH channel and the one or more uplink channels are aligned.

In another aspect, an apparatus for performing wireless communications includes one or more computer processors (e.g., controller/processor 280) and a memory (e.g., memory 282) coupled to the one or more computer processors. The one or more computer processors is configured to receive, by a user equipment (UE) (e.g., 900), a Physical Random Access Channel (PRACH) configuration broadcast by a base station. The PRACH configuration includes a cyclic prefix (CP) length. The one or more computer processors is additionally configured to detect, by the UE, an adjusted CP length of the PRACH configuration. The one or more computer processors is also configured to adjust, by the UE in response to detecting the adjusted CP length, CP length of one or more uplink channels to match the adjusted CP length of the PRACH configuration. The one or more computer processors is further configured to transmit, by the UE, the one or more uplink channels interlaced with a PRACH channel that corresponds to the PRACH configuration. The PRACH channel and the one or more uplink channels are aligned.

Figure 10:
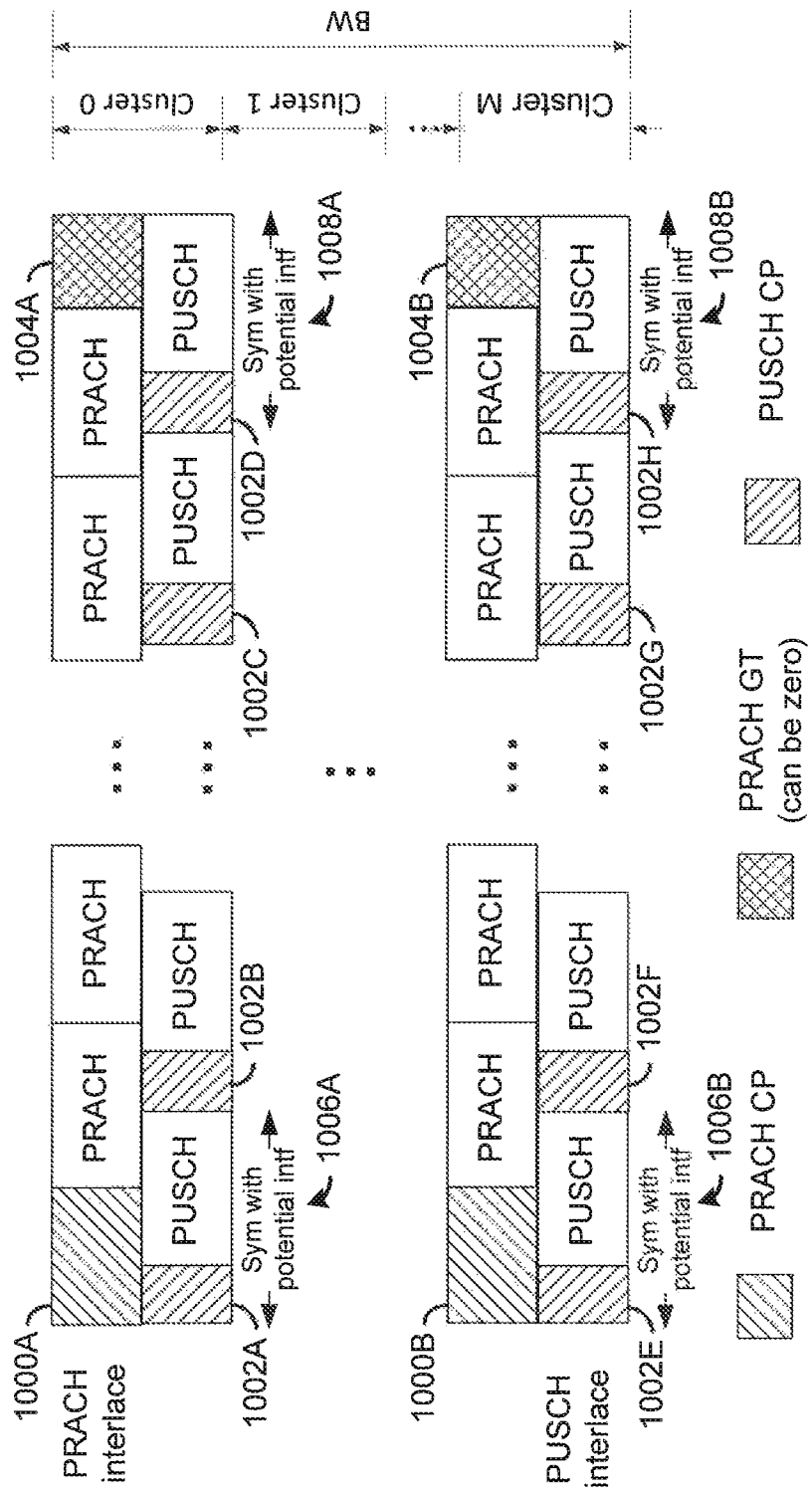
FIG. 10 is a block diagram illustrating repeated PRACH sequences on PRACH channels interlaced with other uplink channels according to one or more aspects of the present disclosure.

Turning now to FIG. 10, an example of a methodology for implementing block interlace that utilizes repeated PRACH sequences on PRACH channels interlaced with other uplink channels without symbol alignment is shown. For this implementation, the CP, such as PRACH CP 1000A and 100B and PUSCH CP 1002A-1002H, and symbol boundary may not be aligned between PRACH and other channels, and the same PRACH sequence may be repeated over multiple PRACH symbols on each interlace. This implementation allows a larger CP for the PRACH channel when a relatively large TA is expected in the deployment, without using the same larger CP for other channels.

With the repeated sequence over the multiple PRACH symbols, except for the first PRACH symbol 1006A and 1006B and/or last PRACH symbol 1008A and 1008B, there is no interference leakage to the adjacent resource elements (REs) from PRACH to other channels. There may be interference leakage to adjacent REs from PRACH to other channels on the first PRACH symbol 1006A and 1006B and last PRACH symbol 1008A and 1008B, depending on the actual TA of the UE and the PRACH format. For example, when the TA is small enough to fit into the PUSCH CP 1002A-1002H, along with the delay spread of the channel, there is no interference on the first PRACH symbol 1006A and 1006B. In this case, the PRACH format does not need to leave any guard time 1004A and 1004B on the last PRACH symbol 1008A and 1008B, which results in no interference on the last PRACH symbol 1008A and 1008B. However, when the TA is too large to fit into the PUSCH CP 1002A-1002H, leakage results on the first PRACH symbol 1006A and 1006B and/or the last PRACH symbol 1008A and 1008B on the adjacent channel, depending on the actual TA of a given PRACH transmission from a given UE. For example, if UE has very large TA, there will be leakage to adjacent REs from PRACH to other channels on the first PRACH symbol and on the last PRACH symbol. Alternatively, if the UE has small TA, there will be leakage only on the last PRACH symbol.

The gNB may configure other UL channels to rate match REs (or a set of REs) adjacent to the PRACH interlace on the first PRACH symbol 1006A and 1006B and the last PRACH symbol 1008A and 1008B when they are multiplexed with PRACH in the frequency domain and depending on the deployment scenario/PRACH format/receiver impact. The set of REs for rate matching can be different on the first and last PRACH symbol. Similarly, there is no interference leakage to the adjacent REs from other channels to PRACH, except for the first PRACH symbol 1006A and 1006B and the last PRACH symbol 1008A and 1008B. In this case, the gNB may take the samples (remove CP and perform FFT) for PRACH processing according to the data symbol boundary. Again when the TA can fit into the PUSCH CP 1002A-1002H, and the PRACH format is used without any guard time, there is no loss on the first PRACH symbol 1006A and 1006B and the last PRACH symbol 1008A and 1008B. However, when the TA is larger and cannot fit into the PUSCH CP 1002A-1002H, the first PRACH symbol 1006A and 1006B and the last PRACH symbol 1008A and 1008B may experience some correlation loss. In this case, it is up to the gNB receiver processing on whether and how to use the first PRACH symbol 1006A and 1006B and the last PRACH symbol 1008A and 1008B for PRACH detection. Rate matching may lead to UE leaving the entire symbol blank which may not be acceptable in unlicensed operation—the UE may need to perform LBT if the UE has any gap in its transmissions. In such cases, the rate matching may also be accompanied with transmission of an extended cyclic prefix/postfix of neighboring symbols to avoid creating gaps in the UE transmission. This may also help to align the starting and/or ending points of different UEs so they perform LBT at similar times and do not block each other's LBT. Alternately, to avoid creating these gaps associated with rate matching, a UE may send data symbols on the potentially interfered symbols (e.g. first and last symbol of a PRACH resource) and take the performance loss due to interference. However, if demodulated reference signals (DMRS) overlap with potentially interfered symbols, the DMRS is moved to other symbols to avoid such interference and data is transmitted on these potentially interfered symbols instead. This is needed as interference on DMRS could lead to complete loss of the data transmission.

Figure 11:
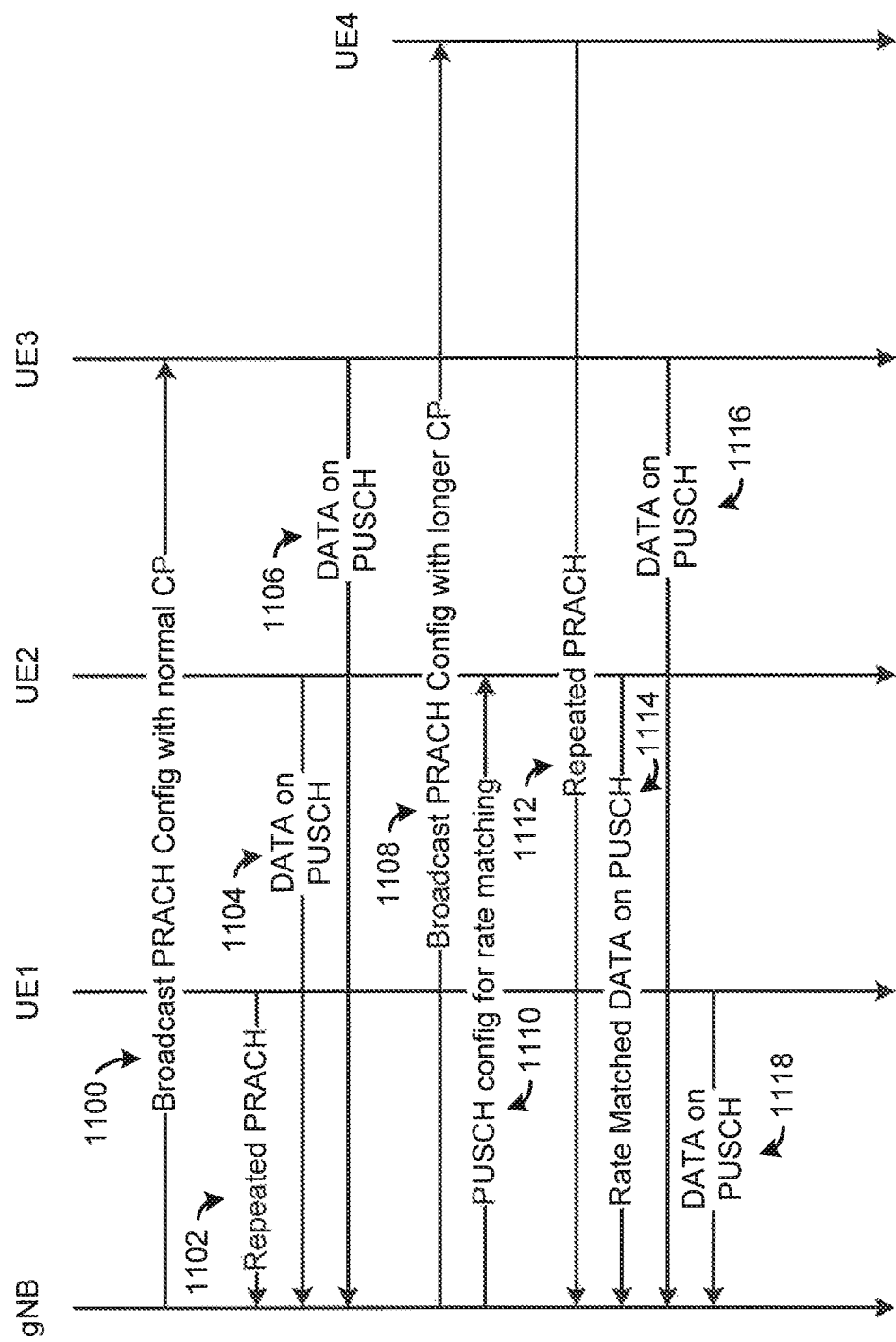
FIG. 11 is a transmission timing diagram illustrating an example of wireless communication according to one or more aspects of the present disclosure.

FIG. 11 provides an example of wireless communication using the unaligned block interlace described above. The base station decides the required CP duration for PRACH based on the target deployment scenario. To illustrate, at 1100, a base station gNB broadcasts a PRACH configuration having NCP, and user equipments UE1, UE2, and UE3 in range of the base station receive this broadcast configuration. At 1102, UE1 transmits a PRACH with NCP to the base station. Contemporaneously, at 1104 and 1106, UE2 and UE3 transmit data on PUSCH with NCP. UE2 and UE3 utilize NCP on PUSCH at 1104 and 1106 because of the observed NCP in the PRACH configuration broadcast at 1100. The base station also knows to expect NCP on PUSCH because it broadcast NCP in the PRACH configuration at 1100.

At 1108, the base station broadcasts a PRACH configuration with the required longer CP duration. This broadcast transmission is received by UE1, UE2, UE3, and UE4.

At 1110, the base station transmits a PUSCH configuration for rate matching to UE2, because UE2 is assigned UL resources adjacent to first and/or last symbols of the repeated PRACH sequence on the PRACH channel. At 1112, UE4 transmits a PRACH with the corresponding PRACH CP duration to the base station. Contemporaneously, at 1114, 1116, and 1118, UE1, UE2, and UE3 transmit data on PUSCH with NCP, and UE2 performs rate matching on the PUSCH symbols according to the configuration received at 1110. For example, UE2 may puncture these PUSCH symbols, and thus avoid transmitting in those symbols. Alternatively, or additionally, it is envisioned that partial puncturing may be performed. For example, perform partial puncturing may include transmitting on a subset of REs allocated instead of all REs allocated. It is noted that rate matching operation can be purely puncturing based—i.e., the rate matching operation can ask UE to prepare packet(s) for all REs but not transmit on the REs that are punctured. Alternately, the rate matching may just ignore the REs that are to be punctured in the packet preparation stage itself.

As a result of the rate matching, the base station receives the PRACH channel with reduced interference on the first and last symbols of the repeated PRACH sequence. The base station may also perform correlation detection in a manner that may not use the first and/or last symbols of the repeated PRACH sequence, or may apply lesser weight to the first and/or last symbols of the repeated PRACH sequence. The base station further receives the PUSCH with punctured symbols and processes the received PUSCH based on knowledge of the puncturing according to the configuration for rate matching. It should be understood that the configuration for rate matching may be communicated just in time, or that UE2 may be preconfigured to perform rate matching in response to a longer CP used for PRACH at 1108.

FIG. 12 is a block diagram illustrating example blocks of a wireless communication procedure carried out by a base station. At block 1200, the procedure begins with receiving, by a base station, one or more uplink channels interlaced with a PRACH channel. The one or more uplink channels interlaced with the PRACH channel may include a Physical Uplink Shared Channel (PUSCH) and/or a Physical Uplink Control Channel (PUCCH). Processing may proceed from block 1200 to block 1202.

At block 1202, the procedure continues with receiving, by the base station, a PRACH sequence repeated on the PRACH channel. The PRACH sequence may have a CP only at the beginning of the sequence, and may or may not have a guard period at the end of the sequence. Processing may proceed from block 1202 to block 1204.

At block 1204, the procedure continues with determining, by the base station, that a timing advance requires a longer duration than a CP length of the one or more uplink channels. Processing may proceed from block 1204 to block 1206.

At block 1206, the procedure continues with performing, by the base station in response to the determining, one or more modifications regarding first and/or last symbols of the one or more uplink channels and/or the PRACH channel. For example, performing one or more modifications may include configuring the one or more uplink channels to rate match one or more resource elements thereof that are adjacent to the PRACH channel on the first and/or last symbols thereof. In some implementations, block 1206 may include configuring the one or more uplink channels to rate match the first symbol thereof but not the last symbol thereof, or configuring the one or more uplink channels to rate match the last symbol thereof but not the first symbol thereof. Alternatively, or additionally, block 1206 may include configuring the one or more uplink channels to rate match the first symbol thereof and the last symbol thereof. In such implementations, the first symbol and the last symbol are configured to rate matched in a same way or a different way.

Another type of modification performed at block 1206 may entail modifying use of the first and/or last symbols of the PRACH channel for PRACH detection. For example, the base station may apply less weight to the first and/or last symbols of the PRACH channel for PRACH detection than to other symbols of the PRACH channel for PRACH detection. This application of weights may include applying less weight to the first symbol of the PRACH channel for PRACH detection but not to the last symbol of the PRACH channel for PRACH detection, or applying less weight to the last symbol of the PRACH channel for PRACH detection but not to the first symbol of the PRACH channel for PRACH detection. Alternatively, or additionally, in some implementations that the applying of weights may entail applying less weight to the first symbol of the PRACH channel for PRACH detection and also applying more weight to the first symbol than to the last symbol of the PRACH channel for PRACH detection, or applying less weight to the last symbol of the PRACH channel for PRACH detection and also applying more weight to the last symbol than to the first symbol of the PRACH channel for PRACH detection. A further alternative for applying weights may entail applying equal weight to the first symbol and to the last symbol of the PRACH channel for PRACH detection.

Alternatively or additionally to applying weights, as described above, the modification at block 1206 may entail not using the first and/or last symbols of the PRACH channel for PRACH detection—e.g., performing PRAC detection independent of the first and/or last symbols of the PRACH. For example, block 1206 may include not using the first symbol of the PRACH channel for PRACH detection and not using the last symbol of the PRACH channel for PRACH detection. Alternatively, block 1206 may include using the first symbol of the PRACH channel for PRACH detection and not using the last symbol of the PRACH channel for PRACH detection, or may include not using the first symbol of the PRACH channel for PRACH detection and using the last symbol of the PRACH channel for PRACH detection. It should also be understood that one of the symbols may be accorded lesser weight while the other symbol is not used, which may be viewed as applying a weight of zero for the symbol that is not used. Processing may return from block 1206 to an earlier point in the process, such as block 1200. Alternatively, processing may end.

FIG. 13 is a block diagram illustrating example blocks of a wireless communication procedure carried out by a user equipment. At block 1300, the procedure begins with transmitting, by a user equipment (UE) to a base station, one or more uplink channels interlaced with a PRACH channel having a PRACH sequence repeated thereon. The one or more uplink channels interlaced with the PRACH channel may include a Physical Uplink Shared Channel (PUSCH) and/or a Physical Uplink Control Channel (PUCCH). Processing may proceed from block 1300 to block 1302.

At block 1302, the procedure continues with receiving, by the UE from the base station, a configuration of the one or more uplink channels to rate match one or more resource elements thereof that are adjacent to the PRACH channel on first and/or last symbols thereof. Processing may proceed from block 1302 to block 1304.

At block 1304, the procedure continues with performing, by the UE, the rate matching according to the configuration. For example, performing the rate matching at block 1304 may include rate matching the first symbol but not the last symbol of the one or more uplink channels, or rate matching the last symbol of the one or more uplink channels but not the first symbol of the one or more uplink channels. In some implementations, block 1304 may include rate matching the first symbol of the one or more uplink channels and the last symbol of the one or more uplink channels. In some such implementations, the first symbol and the last symbol are rate matched in a same way or a different way. Processing may return from block 1304 to an earlier point in the process, such as block 1300. Alternatively, processing may end.

FIG. 14 is a block diagram illustrating example blocks of a wireless communication procedure carried out by a user equipment. At block 1400, the procedure begins with receiving, by a user equipment (UE), a Physical Random Access Channel (PRACH) configuration. The PRACH configuration includes a cyclic prefix (CP) length. Processing may proceed from block 1400 to block 1402.

At block 1402, the procedure continues with transmitting, by the UE, a PRACH sequence repeated on the PRACH channel according to the PRACH configuration. The PRACH channel is interlaced with one or more uplink channels. For example, the one or more uplink channels interlaced with the PRACH channel may include a Physical Uplink Shared Channel (PUSCH) and/or a Physical Uplink Control Channel (PUCCH). Processing may return from block 1402 to an earlier point in the process, such as block 1400. Alternatively, processing may end.

In some implementations, one or more blocks for performing wireless communications include receiving, by a user equipment (UE), a Physical Random Access Channel (PRACH) configuration that utilizes an interlace structure; interlacing the PRACH channel with one or more uplink channels; and performing transmission of one of PRACH or another UL channel using the interlace structure.

In some such implementations, the one or more uplink channels interlaced with the PRACH channel include at least one of a Physical Uplink Shared Channel (PUSCH), a sounding reference signal (SRS), a scheduling request (SR), or a Physical Uplink Control Channel (PUCCH). For example, the one or more uplink channels interlaced with the PRACH may include the PUSCH. As another example, the one or more uplink channels interlaced with the PRACH may include the PUCCH.

In some implementations, the one or more blocks may further include transmitting, by the UE, a PRACH sequence repeated on the PRACH channel according to the PRACH configuration. The PRACH sequence may be different across different symbols.

Additionally, or alternatively, the PRACH configuration may include a cyclic prefix (CP) length. In some implementations, the one or more blocks may also include performing spreading corresponding to multiple PRACH symbols.

In some implementations, the UE may receive, from a base station, a configuration of the one or more uplink channels to rate match one or more resource elements thereof that are adjacent to the PRACH channel on at least one of first or last symbols of the PRACH channel. The UE may perform the rate matching according to the configuration. To perform the rate matching according to the configuration, the UE may perform rate matching of the first symbol of the PRACH channel on one or more uplink channels but not the last symbol of the PRACH channel on one or more uplink channels; or rate matching of the last symbol of the PRACH channel on one or more uplink channels but not the first symbol of the PRACH channel on one or more uplink channels. Performing the rate matching according to the configuration may include rate matching the first symbol of the PRACH channel on one or more uplink channels and the last symbol of the PRACH channel on one or more uplink channels. For example, the first symbol and the last symbol of the PRACH channel may be rate matched in a same way or in a different way. In some implementations, the rate matching configuration also includes transmission of an extended cyclic prefix or cyclic postfix of a neighboring symbol in place of the rate-matched symbol.

In some implementations, the rate matching of an RE comprises not considering that RE during data packet creation. Alternatively, the rate matching of an RE comprises data packet creation that considers this RE but puncturing that RE prior to transmission.

As described with reference to one or more of FIGS. 10-14, an adaptation of uplink channels is enabled and/or provided to accommodate an increase in size of a cyclic prefix of a PRACH channel interlaced with the uplink channels.

Figure 15:
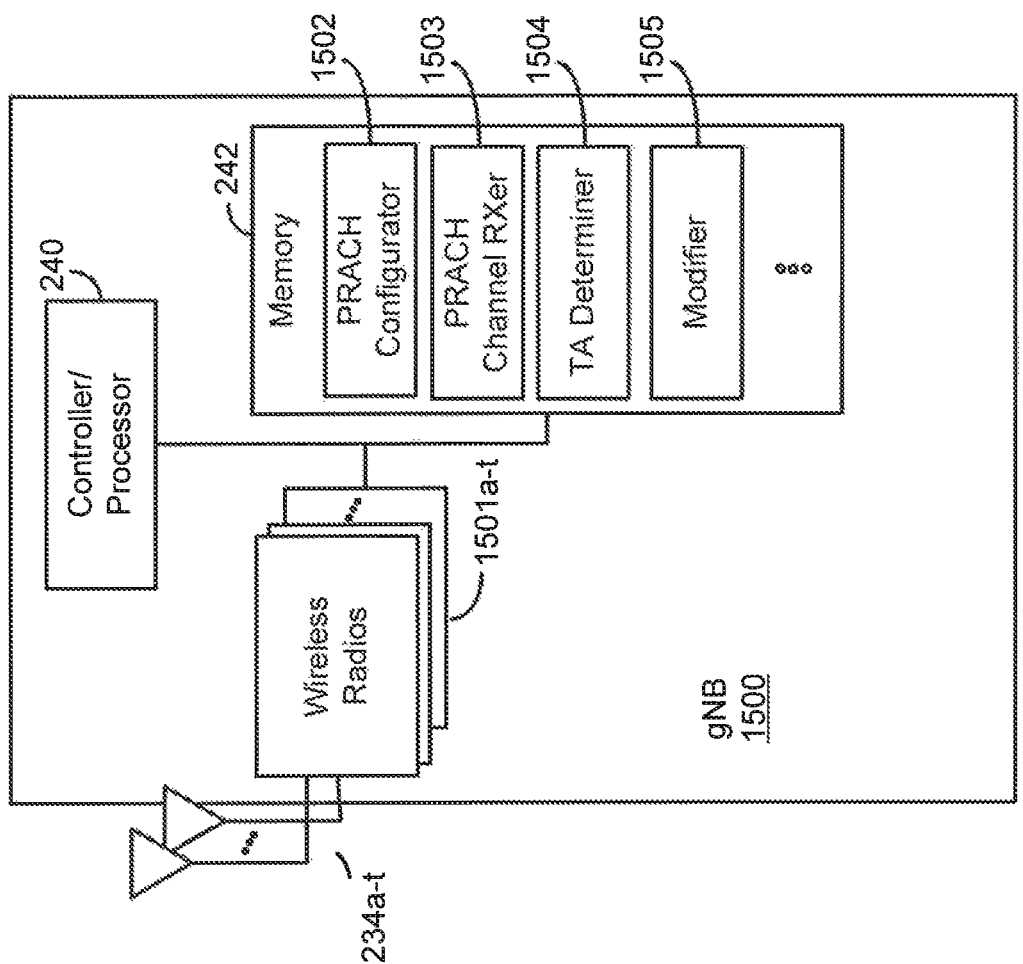
FIG. 15 is a block diagram illustrating a base station configured according to one or more aspects of the present disclosure.

Turning now to FIG. 15, a base station 1500, such as a NR-SS base station 105 (see FIG. 2), may have a controller/processor 240, a memory 242, and antennas 234*a* through 234*t*, as described above. The base station 1500 may also have wireless radios 1501*a* to 1501*t* that comprise additional components also described above with reference to FIG. 2. The memory 242 of base station 1500 stores algorithms that configure processor/controller 240 to carry out procedures as described above with reference to FIGS. 3 and 10-14.

Algorithms stored by memory 242 configure processor/controller 240 to carry out operations relating to wireless communication by the base station 1500, as previously described. For example, PRACH configurator 1502 configures controller processor 240 to carry out operations that include broadcasting a PRACH configuration in any manner previously described. Additionally, PRACH channel receiver 1503 configures controller processor 240 to carry out operations that include receiving a PRACH channel having a repeated PRACH sequence in any manner previously described. Also, TA determiner 1504 configures controller processor 240 to carry out operations that include determining a need for a larger TA that will not fit within a CP of other uplink channels in any manner previously described. Further, modifier 1505 configures controller processor 240 to carry out operations that include configuring rate matching for resource elements on UL channels adjacent to first and/or last symbols of the repeated PRACH sequence, and/or weighting use of those first and/or last symbols for PRACH detection in any manner previously described.

In another aspect, an apparatus (e.g., 1500) for performing wireless communications includes means for receiving, by a base station (e.g., 1500), one or more uplink channels interlaced with a PRACH channel. The apparatus additionally includes means for receiving, by the base station, a PRACH sequence repeated on the PRACH channel. The apparatus also includes means for determining, by the base station, that a timing advance (TA) has a longer duration than a CP length of the one or more uplink channels. The apparatus further includes means for performing, by the base station in response to the means for determining, one or more modifications regarding first and/or last symbols of the PRACH channel.

In another aspect, an apparatus (e.g., 1500) for performing wireless communications includes a computer readable storage device (e.g., 242), such as a non-transitory computer readable storage medium, having instructions recorded thereon that, when enacted by one or more computer processors (e.g., 240), cause the one or more computer processors to receive, by a base station (e.g., 1500), one or more uplink channels interlaced with a PRACH channel. The instructions additionally cause the one or more computer processors to receive, by the base station, a PRACH sequence repeated on the PRACH channel. The instructions also cause the one or more computer processors to determine, by the base station, that a timing advance (TA) has a longer duration than a CP length of the one or more uplink channels. The instructions further cause the one or more computer processors to perform, by the base station in response to the determining, one or more modifications regarding first and/or last symbols of the PRACH channel.

In another aspect, an apparatus (e.g., 1500) for performing wireless communications includes one or more computer processors (e.g., 240) and a memory (e.g., 242) coupled to the one or more computer processors. The one or more computer processors is configured to receive, by a base station, one or more uplink channels interlaced with a PRACH channel. The one or more computer processors is additionally configured to receive, by the base station, a PRACH sequence repeated on the PRACH channel. The one or more computer processors is also configured to determine, by the base station, that a timing advance (TA) has a longer duration than a CP length of the one or more uplink channels. The one or more computer processors is further configured to perform, by the base station in response to the determining, one or more modifications regarding first and/or last symbols of the PRACH channel.

It is noted that one or more blocks (or operations) described with reference to FIG. 15 may be combined with one or more blocks (or operations) of another of figure, such as FIG. 8. For example, one or more blocks of FIG. 1500 may be combined with one or more blocks (or operations) of another of FIG. 8. To illustrate, in some implementations, a base station may be configured to operate as described with reference to FIG. 6 during a first time, and may be configured to operate as described with reference to FIG. 12 during a second time period. Additionally, or alternatively, the base station may be configured to operate as described with reference to FIG. 6 with respect to a first UE during a first time, and may be configured to operate as descried with reference to FIG. 12 with respect to a second UE during the first time period. Further, in some implementations, one or more operations described above with reference to FIGS. 1-7 may be combine with one or more operations described with reference to FIG. 16, such as FIGS. 10-15.

Figure 16:
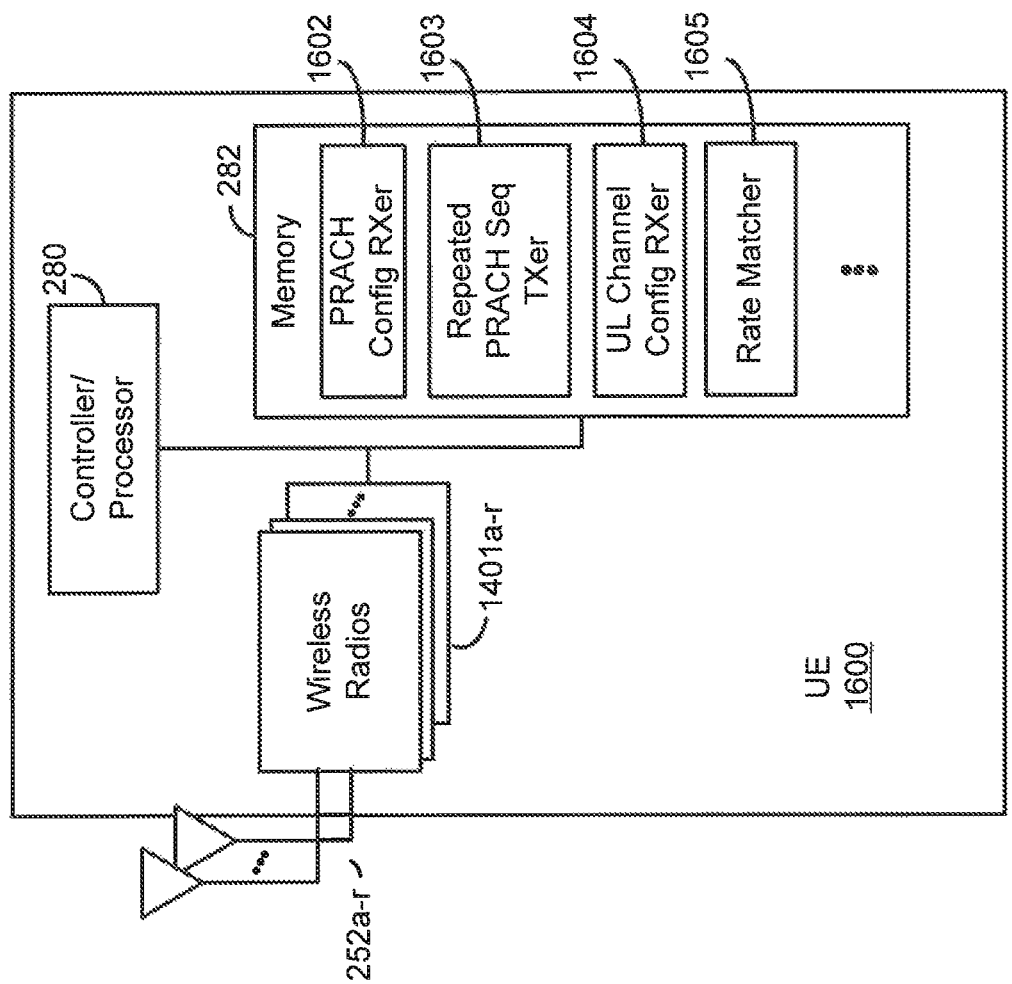
FIG. 16 is a block diagram illustrating a UE configured according to one or more aspects of the present disclosure.

Turning now to FIG. 16, a UE 1600, such as a UE 115 (see FIG. 2), may have a controller/processor 280, a memory 282, and antennas 252a through 252r, as described above. UE 900 may also have wireless radios 1601a to 1601r that comprise additional components also described above with reference to FIG. 2. The memory 282 of UE 1600 stores algorithms that configure processor/controller 280 to carry out procedures as described above with reference to FIGS. 3 and 10-14.

Algorithms stored by memory 282 configure processor/controller 280 to carry out procedures relating to wireless communication by the UE 1600, as previously described. For example, PRACH configuration receiver 1602 configures controller processor 280 to carry out operations that include receiving a PRACH configuration in any manner previously described. Additionally, repeated PRACH sequence transmitter 1603 configures controller processor 280 to carry out operations that include transmitting a repeated PRACH sequence on a PRACH channel according to the configuration in any manner previously described. Also, uplink channel configuration receiver 1604 configures controller processor 280 to carry out operations that include receiving a configuration for performing rate matching on resource elements of UL channels adjacent to first and/or last symbols of the repeated PRACH sequence in any manner previously described. Further, rate matcher 1605 configures controller processor 280 to carry out operations that include performing the rate matching according to the configuration in any manner previously described.

In another aspect, an apparatus (e.g., 1600) for performing wireless communications includes means for transmitting, by a user equipment (UE) to a base station (e.g., 105), one or more uplink channels interlaced with a PRACH channel having a PRACH sequence repeated thereon. The apparatus additionally includes means for receiving, by the UE from the base station, a configuration of the one or more uplink channels to rate match one or more resource elements thereof that are adjacent to the PRACH channel on first and/or last symbols thereof. The apparatus also includes means for performing, by the UE, the rate matching according to the configuration.

In another aspect, an apparatus (e.g., 1600) for performing wireless communications includes a computer readable storage device (e.g., 282), such as a non-transitory computer readable medium, having instructions recorded thereon that, when enacted by one or more computer processors (e.g., 280), cause the one or more computer processors to transmit, by a user equipment (UE) to a base station (e.g., 105), one or more uplink channels interlaced with a PRACH channel having a PRACH sequence repeated thereon. The instructions additionally cause the one or more computer processors to receive, by the UE from the base station, a configuration of the one or more uplink channels to rate match one or more resource elements thereof that are adjacent to the PRACH channel on first and/or last symbols thereof. The instructions also cause the one or more computer processors to perform, by the UE, the rate matching according to the configuration.

In another aspect, an apparatus (e.g., 1600) for performing wireless communications includes one or more computer processors (e.g., 280) and a memory (e.g., 282) coupled to the one or more computer processors. The one or more computer processors is configured to transmit, by a user equipment (UE) to a base station (e.g., 105), one or more uplink channels interlaced with a PRACH channel having a PRACH sequence repeated thereon. The one or more computer processors is additionally configured to receive, by the UE from the base station, a configuration of the one or more uplink channels to rate match one or more resource elements thereof that are adjacent to the PRACH channel on first and/or last symbols thereof. The one or more computer processors is further configured to perform, by the UE, the rate matching according to the configuration.

In another aspect, an apparatus (e.g., 1600) for performing wireless communications includes means for receiving, by a user equipment (UE), a Physical Random Access Channel (PRACH) configuration. The PRACH configuration includes a cyclic prefix (CP) length. The apparatus additionally includes means for transmitting, by the UE, a PRACH sequence repeated on the PRACH channel according to the PRACH configuration. The PRACH channel is interlaced with one or more uplink channels.

In another aspect, an apparatus (e.g., 1600) for performing wireless communications includes a computer readable storage device (e.g., 282) having instructions recorded thereon that, when enacted by one or more computer processors (e.g., 280), cause the one or more computer processors to receive, by a user equipment (UE), a Physical Random Access Channel (PRACH) configuration. The PRACH configuration includes a cyclic prefix (CP) length. The instructions also cause the one or more computer processors to transmit, by the UE, a PRACH sequence repeated on the PRACH channel according to the PRACH configuration. The PRACH channel is interlaced with one or more uplink channels.

In another aspect, an apparatus (e.g., 1600) for performing wireless communications includes one or more computer processors (e.g., 280) and a memory (e.g., 282) coupled to the one or more computer processors. The one or more computer processors is configured to receive, by a user equipment (UE), a Physical Random Access Channel (PRACH) configuration. The PRACH configuration includes a cyclic prefix (CP) length. The one or more computer processors is additionally configured to transmit, by the UE, a PRACH sequence repeated on the PRACH channel according to the PRACH configuration. The PRACH channel is interlaced with one or more uplink channels.

In another aspect, an apparatus for performing wireless communications includes means for receiving, by a user equipment (UE) (e.g., 1600), a Physical Random Access Channel (PRACH) configuration that utilizes an interlace structure. The apparatus additionally includes means for interlacing the PRACH channel with one or more uplink channels and means for performing transmission of one of PRACH or another UL channel using the interlace structure.

In another aspect, an apparatus for performing wireless communications includes a computer readable medium (e.g., 282) having instructions recorded thereon that, when enacted by one or more computer processors (e.g., 280), cause the one or more computer processors to receive, by a user equipment (UE) (e.g., 1600), a Physical Random Access Channel (PRACH) configuration that utilizes an interlace structure. The instructions also cause the one or more computer processors to interlace the PRACH channel with one or more uplink channels and perform transmission of one of PRACH or another UL channel using the interlace structure.

In another aspect, an apparatus for performing wireless communications includes one or more computer processors (e.g., 280) and a memory (e.g., 282) coupled to the one or more computer processors. The one or more computer processors is configured to receive, by a user equipment (UE) (e.g., 1600), a Physical Random Access Channel (PRACH) configuration that utilizes an interlace structure. The one or more computer processors is additionally configured to interlace the PRACH channel with one or more uplink channels and perform transmission of one of PRACH or another UL channel using the interlace structure.

It is noted that one or more blocks (or operations) described with reference to FIG. 16 may be combined with one or more blocks (or operations) of another of figure, such as FIG. 9. For example, one or more blocks of FIG. 1600 may be combined with one or more blocks (or operations) of another of FIG. 9. To illustrate, in some implementations, a UE may be configured to operate as described with reference to FIG. 7 during a first time, and may be configured to operate as described with reference to FIG. 15 during a second time period. Additionally, or alternatively, one or more operations described above with reference to FIGS. 1-7 may be combine with one or more operations described with reference to FIG. 16, such as FIGS. 10-15.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 2-16) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of performing wireless communications, the method comprising:
    receiving, by a user equipment (UE), a Physical Random Access Channel (PRACH) configuration from a base station, the PRACH configuration indicating a first cyclic prefix (CP) length for a PRACH channel that corresponds to the PRACH configuration;
    transmitting, by the UE, one or more uplink channels interlaced in a frequency domain with the PRACH channel, the PRACH channel allocated to multiple spaced resource blocks of a block interlace structure in the frequency domain;
    receiving, by the UE, a second PRACH configuration from the base station, the second PRACH configuration indicating a second CP length for the PRACH channel; and
    transmitting, by the UE, the one or more uplink channels with an adjusted CP length interlaced in the frequency domain with the PRACH channel, wherein a CP length of the one or more uplink channels is adjusted from an initial CP length to the adjusted CP length that matches the second CP length of the second PRACH configuration, and wherein the PRACH channel and the one or more uplink channels are aligned;
    wherein adjusting the CP length of the one or more uplink channels comprises adjusting CP lengths of multiple uplink channels to match the second CP length of the second PRACH configuration.

2. The method of claim 1, wherein the adjusted CP length is used when the one or more uplink channels are frequency domain multiplexed with the PRACH channel, and wherein the block interlace structure is used to multiplex the PRACH channel with the one or more uplink channels in the frequency domain.

3. The method of claim 1, wherein the initial CP length of the one or more uplink channels comprises a normal CP length, and wherein the adjusted CP length of the one or more uplink channels comprises an extended CP length.

4. The method of claim 1, wherein the CP length of the one or more uplink channels is adjusted to match the second CP length of the second PRACH configuration in response to detection of the second CP length of the second PRACH configuration being different than the first CP length of the PRACH configuration.

5. The method of claim 1, wherein the one or more uplink channels interlaced with the PRACH channel includes at least one of a Physical Uplink Shared Channel (PUSCH), a sounding reference signal (SRS), a scheduling request (SR), or a Physical Uplink Control Channel (PUCCH).

6. The method of claim 1, wherein the PRACH channel and the one or more uplink channels are aligned in terms of subcarrier spacing (SCS), CP, symbol boundary, or a combination thereof.

7. The method of claim 1, wherein a PRACH sequence associated with the PRACH channel is different across different symbols.

8. The method of claim 1 wherein the PRACH channel is spread in time using an orthogonal cover code corresponding to multiple PRACH symbols- to increase a multiplexing capability.

9. The method of claim 1, wherein the multiple spaced resource blocks corresponding to the PRACH channel in the block interlace structure are separated in the frequency domain by resource blocks allocated to the one or more uplink channels.

10. The method of claim 9, wherein a sequence of resource blocks in the block interlace structure ordered by increasing frequency comprises: a first resource block allocated to the PRACH channel, a set of one or more resource blocks allocated to the one or more uplink channels, and a second resource block allocated to the PRACH channel.

11. An apparatus configured for wireless communication, the apparatus comprising:
   at least one processor; and
   a memory coupled to the at least one processor;
   wherein the at least one processor is configured to:
      receive a Physical Random Access Channel (PRACH) configuration from a base station, the PRACH configuration indicating a first cyclic prefix (CP) length for a PRACH channel that corresponds to the PRACH configuration;
      transmit one or more uplink channels interlaced in a frequency domain with the PRACH channel, the PRACH channel allocated to multiple spaced resource blocks of a block interlace structure in the frequency domain;
      receive a second PRACH configuration from the base station, the second PRACH configuration indicating a second CP length for the PRACH channel; and
      transmit the one or more uplink channels with an adjusted CP length interlaced in the frequency domain with the PRACH channel, wherein a CP length of the one or more uplink channels is adjusted from an initial CP length to the adjusted CP length that matches the second CP length of the second PRACH configuration, and wherein the PRACH channel and the one or more uplink channels are aligned; and
      wherein adjusting the CP length of the one or more uplink channels comprises adjusting CP lengths of multiple uplink channels to match the second CP length of the second PRACH configuration.

12. The apparatus of claim 11, wherein the one or more uplink channels interlaced with the PRACH channel includes at least one of a Physical Uplink Shared Channel (PUSCH) or a Physical Uplink Control Channel (PUCCH).

13. The apparatus of claim 11, wherein the PRACH channel and the one or more uplink channels are aligned in terms of subcarrier spacing (SCS), CP, and symbol boundary.

14. A method of performing wireless communications, the method comprising:
   receiving, by a user equipment (UE) from a base station, a Physical Random Access Channel (PRACH) configuration that utilizes an interlace structure the PRACH configuration corresponding to a PRACH channel that is allocated to multiple spaced resource blocks of the interlace structure in a frequency domain;
   receiving, by the UE from the base station, a configuration of one or more uplink channels to rate match one or more resource elements of the one or more uplink channels that are adjacent to the PRACH channel on a first symbol of the PRACH channel, a last symbol of the PRACH channel, or a combination thereof; and
   transmitting the one or more uplink channels using rate matching and the interlace structure to interlace the one or more uplink channels with the PRACH channel in the frequency domain, the rate matching comprising transmitting an extended cyclic prefix or an extended cyclic postfix of a neighboring symbol in place of the one or more uplink channels on the first symbol, the last symbol, or a combination thereof.

15. The method of claim 14 wherein a PRACH sequence is repeated on the PRACH channel according to the PRACH configuration.

16. The method of claim 14, wherein a PRACH sequence is different on the PRACH channel across different symbols.

17. The method of claim 14, wherein the one or more uplink channels interlaced with the PRACH channel includes at least one of a Physical Uplink Shared Channel (PUSCH), a sounding reference signal (SRS), a scheduling request (SR), or a Physical Uplink Control Channel (PUCCH).

18. The method of claim 14, wherein the PRACH channel is spread in time to multiple PRACH symbols.

19. The method of claim 14, further comprising:
   performing, by the UE, the rate matching according to the configuration.

20. The method of claim 19, wherein the performing the rate matching according to the configuration includes:
   rate matching the first symbol of the PRACH channel on the one or more uplink channels but not the last symbol of the PRACH channel on the one or more uplink channels;
   rate matching the last symbol of the PRACH channel on the one or more uplink channels but not the first symbol of the PRACH channel on the one or more uplink channels; or
   rate matching the first symbol of the PRACH channel on the one or more uplink channels and the last symbol of the PRACH channel on the one or more uplink channels.

21. The method of claim 20, wherein the rate matching includes performing a same type of rate matching operation on the first symbol and the last symbol.

22. The method of claim 19, wherein rate matching of a resource element (RE) comprises not considering the RE during data packet creation.

23. The method of claim 19, wherein rate matching of a resource element (RE) comprises data packet creation that considers the RE and punctures the RE prior to transmission.

24. The method of claim 20, wherein the rate matching includes performing a first type of rate matching operation on the first symbol and performing a second type of rate matching operation on the last symbol, the first type of rate matching operation different than the second type of rate matching operation.

25. The method of claim 20, wherein the performing the rate matching according to the configuration further includes transmitting the extended cyclic prefix or the extended cyclic postfix of a neighboring symbol in place of the rate-matched first symbol and transmitting the extended cyclic prefix or the extended cyclic postfix of a neighboring symbol in place of the rate-matched last symbol.

26. An apparatus configured for wireless communication, the apparatus comprising:
   at least one processor; and
   a memory coupled to the at least one processor;
   wherein the at least one processor is configured to:
      receive, from a base station, a Physical Random Access Channel (PRACH) configuration that utilizes an interlace structure, the PRACH configuration corresponding to a PRACH channel that is allocated to multiple spaced resource blocks of the interlace structure in a frequency domain;
      receive, from the base station, a configuration of one or more uplink channels to rate match one or more resource elements of the one or more uplink channels that are adjacent to the PRACH channel on a first symbol of the PRACH channel, a last symbol of the PRACH channel, or a combination thereof; and
      transmit the one or more uplink channels using rate matching the interlace structure to interlace the one or more uplink channels with the PRACH channel in the frequency domain, the rate matching comprising transmitting an extended cyclic prefix or an extended cyclic postfix of a neighboring symbol in place of the one or more uplink channels on the first symbol, the last symbol, or a combination thereof.

27. The apparatus of claim 26, wherein:
   the one or more uplink channels interlaced with the PRACH channel includes at least one of a Physical Uplink Shared Channel (PUSCH), a sounding reference signal (SRS), a scheduling request (SR), or a Physical Uplink Control Channel (PUCCH).

28. The apparatus of claim 26, wherein the rate matching comprises transmitting the extended cyclic prefix or the extended cyclic postfix of a neighboring symbol in place of the one or more uplink channels on the rate-matched first symbol and not on the last symbol.

29. The apparatus of claim 26, wherein the rate matching comprises transmitting the extended cyclic prefix or the extended cyclic postfix of a neighboring symbol in place of the one or more uplink channels on the rate-matched last symbol and not on the first symbol.

\* \* \* \* \*